United States Patent [19]
Ouderkirk et al.

[11] Patent Number: 5,783,120
[45] Date of Patent: Jul. 21, 1998

[54] METHOD FOR MAKING AN OPTICAL FILM

[75] Inventors: Andrew J. Ouderkirk, Woodbury; Lockwood W. Carlson, Stillwater; Arthur L. Kotz, White Bear Lake; Timothy J. Nevitt, Red Wing; Carl A. Stover, St. Paul; Michael F. Weber, Shoreview; Richard C. Allen, Mendota Heights; Biswaroop Majumdar, Woodbury, all of Minn.

[73] Assignee: Minnesota Mining and Manufacturing Company, St. Paul, Minn.

[21] Appl. No.: 610,109

[22] Filed: Feb. 29, 1996

[51] Int. Cl.$^6$ .......................................... B29D 11/00
[52] U.S. Cl. .................... 264/1.34; 264/1.9; 264/2.7
[58] Field of Search ........................... 264/1.34, 1.7, 264/108, 1.9, 2.7, 288.4, 290.2

[56] References Cited

U.S. PATENT DOCUMENTS

| | | |
|---|---|---|
| 2,246,087 | 6/1941 | Bailey et al. . |
| 2,604,817 | 7/1952 | Schupp, Jr. . |
| 3,561,841 | 2/1971 | Norvaisa et al. . |
| 4,717,225 | 1/1988 | Feth et al. . |
| 5,122,905 | 6/1992 | Wheatley et al. . |
| 5,202,938 | 4/1993 | Man et al. . |
| 5,222,795 | 6/1993 | Hed . |
| 5,316,703 | 5/1994 | Schrenk .................... 264/1.34 |
| 5,366,781 | 11/1994 | Coburn et al. . |
| 5,394,255 | 2/1995 | Yokota et al. . |
| 5,486,949 | 1/1996 | Schrenk et al. ............. 264/1.34 |

FOREIGN PATENT DOCUMENTS

| | | |
|---|---|---|
| 0 464 499 A2 | 1/1992 | European Pat. Off. . |
| 0 488 627 A2 | 6/1992 | European Pat. Off. . |
| 0 506 176 A1 | 9/1992 | European Pat. Off. . |
| 0 597 261 A1 | 5/1994 | European Pat. Off. . |
| 0 684 423 A2 | 11/1995 | European Pat. Off. . |
| 6001871 | 1/1994 | Japan . |
| WO 94/29765 | 12/1994 | WIPO . |
| WO 96/31794 | 10/1996 | WIPO . |

*Primary Examiner*—Mathieu D. Vargot
*Attorney, Agent, or Firm*—John A. Fortkort

[57] ABSTRACT

An optical film is provided which includes a disperse phase of polymeric particles disposed within a continuous birefringent matrix. The film is oriented, typically by stretching, in one or more directions. The size and shape of the disperse phase particles, the volume fraction of the disperse phase, the film thickness, and the amount of orientation are chosen to attain a desired degree of diffuse reflection and total transmission of electromagnetic radiation of a desired wavelength in the resulting film.

48 Claims, 4 Drawing Sheets

ORIENTATION

METHOD FOR MAKING AN OPTICAL FILM

FIELD OF THE INVENTION

This invention relates to optical materials which contain structures suitable for controlling optical characteristics, such as reflectance and transmission. In a further aspect, it relates to control of specific polarizations of reflected or transmitted light.

BACKGROUND

Optical films are known to the art which are constructed from inclusions dispersed within a continuous matrix. The characteristics of these inclusions can be manipulated to provide a range of reflective and transmissive properties to the film. These characteristics include inclusion size with respect to wavelength within the film, inclusion shape and alignment, inclusion volumetric fill factor and the degree of refractive index mismatch with the continuous matrix along the film's three orthogonal axes.

Conventional absorbing (dichroic) polarizers have, as their inclusion phase, inorganic rod-like chains of light-absorbing iodine which are aligned within a polymer matrix. Such a film will tend to absorb light polarized with its electric field vector aligned parallel to the rod-like iodine chains, and to transmit light polarized perpendicular to the rods. Because the iodine chains have two or more dimensions that are small compared to the wavelength of visible light, and because the number of chains per cubic wavelength of light is large, the optical properties of such a film are predominately specular, with very little diffuse transmission through the film or diffuse reflection from the film surfaces. Like most other commercially available polarizers, these polarizing films are based on polarization-selective absorption.

Films filled with inorganic inclusions with different characteristics can provide other optical transmission and reflective properties. For example, coated mica flakes with two or more dimensions that are large compared with visible wavelengths, have been incorporated into polymeric films and into paints to impart a metallic glitter. These flakes can be manipulated to lie in the plane of the film, thereby imparting a strong directional dependence to the reflective appearance. Such an effect can be used to produce security screens that are highly reflective for certain viewing angles, and transmissive for other viewing angles. Large flakes having a coloration (specularly selective reflection) that depends on alignment with respect to incident light, can be incorporated into a film to provide evidence of tampering. In this application, it is necessary that all the flakes in the film be similarly aligned with respect to each other.

However, optical films made from polymers filled with inorganic inclusions suffer from a variety of infirmities. Typically, adhesion between the inorganic particles and the polymer matrix is poor. Consequently, the optical properties of the film decline when stress or strain is applied across the matrix, both because the bond between the matrix and the inclusions is compromised, and because the rigid inorganic inclusions may be fractured. Furthermore, alignment of inorganic inclusions requires process steps and considerations that complicate manufacturing.

Other films, such as that disclosed in U.S. Pat. No. 4,688,900 (Doane et. al.), consists of a clear light-transmitting continuous polymer matrix, with droplets of light modulating liquid crystals dispersed within. Stretching of the material reportedly results in a distortion of the liquid crystal droplet from a spherical to an ellipsoidal shape, with the long axis of the ellipsoid parallel to the direction of stretch. U.S. Pat. No. 5,301,041 (Konuma et al.) make a similar disclosure, but achieve the distortion of the liquid crystal droplet through the application of pressure. A. Aphonin, "Optical Properties of Stretched Polymer Dispersed Liquid Crystal Films: Angle-Dependent Polarized Light Scattering. *Liquid Crystals*, Vol. 19, No. 4, 469–480 (1995), discusses the optical properties of stretched films consisting of liquid crystal droplets disposed within a polymer matrix. He reports that the elongation of the droplets into an ellipsoidal shape, with their long axes parallel to the stretch direction, imparts an oriented birefringence (refractive index difference among the dimensional axes of the droplet) to the droplets, resulting in a relative refractive index mismatch between the dispersed and continuous phases along certain film axes, and a relative index match along the other film axes. Such liquid crystal droplets are not small as compared to visible wavelengths in the film, and thus the optical properties of such films have a substantial diffuse component to their reflective and transmissive properties. Aphonin suggests the use of these materials as a polarizing diffuser for backlit twisted nematic LCDs. However, optical films employing liquid crystals as the disperse phase are substantially limited in the degree of refractive index mismatch between the matrix phase and the dispersed phase. Furthermore, the birefringence of the liquid crystal component of such films is typically sensitive to temperature.

U.S. Pat. No. 5,268,225 (Isayev) discloses a composite laminate made from thermotropic liquid crystal polymer blends. The blend consists of two liquid crystal polymers which are immiscible with each other. The blends may be cast into a film consisting of a dispersed inclusion phase and a continuous phase. When the film is stretched, the dispersed phase forms a series of fibers whose axes are aligned in the direction of stretch. While the film is described as having improved mechanical properties, no mention is made of the optical properties of the film. However, due to their liquid crystal nature, films of this type would suffer from the infirmities of other liquid crystal materials discussed above.

Still other films have been made to exhibit desirable optical properties through the application of electric or magnetic fields. For example, U.S. Pat. No. 5,008,807 (Waters et al.) describes a liquid crystal device which consists of a layer of fibers permeated with liquid crystal material and disposed between two electrodes. A voltage across the electrodes produces an electric field which changes the birefringent properties of the liquid crystal material, resulting in various degrees of mismatch between the refractive indices of the fibers and the liquid crystal. However, the requirement of an electric or magnetic field is inconvenient and undesirable in many applications, particularly those where existing fields might produce interference.

Other optical films have been made by incorporating a dispersion of inclusions of a first polymer into a second polymer, and then stretching the resulting composite in one or two directions. U.S. Pat. No. 4,871,784 (Otonari et al.) is exemplative of this technology. The polymers are selected such that there is low adhesion between the dispersed phase and the surrounding matrix polymer, so that an elliptical void is formed around each inclusion when the film is stretched. Such voids have dimensions of the order of visible wavelengths. The refractive index mismatch between the void and the polymer in these "microvoided" films is typically quite large (about 0.5), causing substantial diffuse reflection. However, the optical properties of microvoided materials are difficult to control because of variations of the geometry of the interfaces, and it is not possible to produce a film axis for which refractive indices are relatively matched, as would be useful for polarization-sensitive optical properties. Furthermore, the voids in such material can be easily collapsed through exposure to heat and pressure.

Optical films have also been made wherein a dispersed phase is deterministically arranged in an ordered pattern within a continuous matrix. U.S. Pat. No. 5,217,794 (Schrenk) is exemplative of this technology. There, a lamellar polymeric film is disclosed which is made of polymeric inclusions which are large compared with wavelength on two axes, disposed within a continuous matrix of another polymeric material. The refractive index of the dispersed phase differs significantly from that of the continuous phase along one or more of the laminate's axes, and is relatively well matched along another. Because of the ordering of the dispersed phase, films of this type exhibit strong iridescence (i.e., interference-based angle dependent coloring) for instances in which they are substantially reflective. As a result, such films have seen limited use for optical applications where optical diffusion is desirable.

There thus remains a need in the art for an optical material consisting of a continuous and a dispersed phase, wherein the refractive index mismatch between the two phases along the material's three dimensional axes can be conveniently and permanently manipulated to achieve desirable degrees of diffuse and specular reflection and transmission, wherein the optical material is stable with respect to stress, strain, temperature differences, and electric and magnetic fields, and wherein the optical material has an insignificant level of iridescence. These and other needs are met by the present invention, as hereinafter disclosed.

SUMMARY OF THE INVENTION

Figure 1:
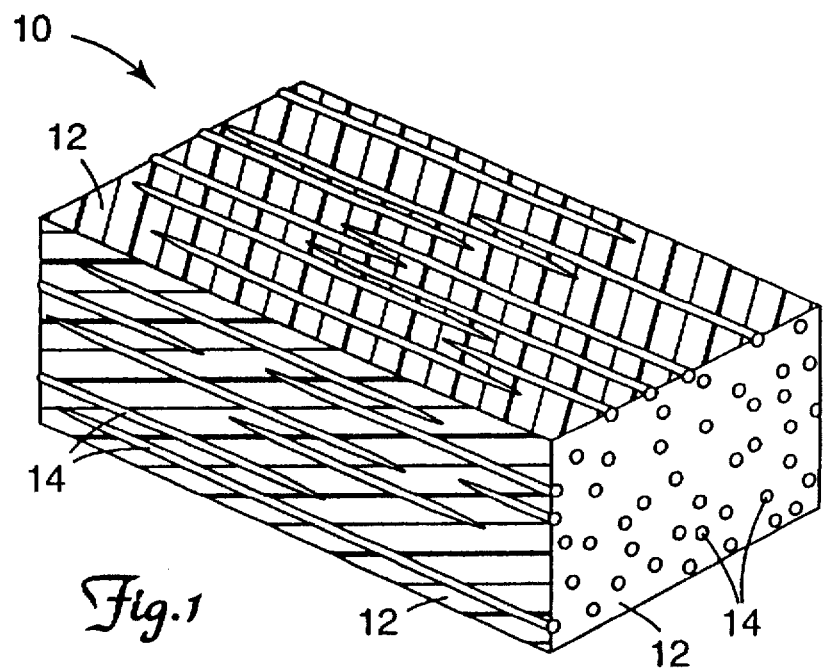
FIG. 1 is a schematic drawing illustrating an optical body made in accordance with the present invention, wherein the disperse phase is arranged as a series of elongated masses having an essentially circular cross-section.

In one aspect, the present invention relates to a diffusely reflective film or other optical body comprising a birefringent continuous polymeric phase and a substantially nonbirefringent disperse phase disposed within the continuous phase. The indices of refraction of the continuous and disperse phases are substantially mismatched (i.e., differ from one another by more than about 0.05) along a first of three mutually orthogonal axes, and are substantially matched (i.e., differ by less than about 0.05) along a second of three mutually orthogonal axes. In some embodiments, the indices of refraction of the continuous and disperse phases can be substantially matched or mismatched along, or parallel to, a third of three mutually orthogonal axes to produce a mirror or a polarizer. Incident light polarized along, or parallel to, a mismatched axis is scattered, resulting in significant diffuse reflection. Incident light polarized along a matched axis is scattered to a much lesser degree and is significantly spectrally transmitted. These properties can be used to make optical films for a variety of uses, including low loss (significantly nonabsorbing) reflective polarizers for which polarizations of light that are not significantly transmitted are diffusely reflected.

In a related aspect, the present invention relates to an optical film or other optical body comprising a birefringent continuous phase and a disperse phase, wherein the indices of refraction of the continuous and disperse phases are substantially matched (i.e., wherein the index difference between the continuous and disperse phases is less than about 0.05) along an axis perpendicular to a surface of the optical body.

In another aspect, the present invention relates to a composite optical body comprising a polymeric continuous birefringent first phase in which the disperse second phase may be birefringent, but in which the degree of match and mismatch in at least two orthogonal directions is primarily due to the birefringence of the first phase.

In still another aspect, the present invention relates to a method for obtaining a diffuse reflective polarizer, comprising the steps of: providing a first resin, whose degree of birefringence can be altered by application of a force field, as through dimensional orientation or an applied electric field, such that the resulting resin material has, for at least two orthogonal directions, an index of refraction difference of more than about 0.05; providing a second resin, dispersed within the first resin; and applying said force field to the composite of both resins such that the indices of the two resins are approximately matched to within less than about 0.05 in one of two directions, and the index difference between first and second resins in the other of two directions is greater than about 0.05. In a related embodiment, the second resin is dispersed in the first resin after imposition of the force field and subsequent alteration of the birefringence of the first resin.

In yet another aspect, the present invention relates to an optical body acting as a reflective polarizer with a high extinction ratio. In this aspect, the index difference in the match direction is chosen as small as possible and the difference in the mismatch direction is maximized. The volume fraction, thickness, and disperse phase particle size and shape can be chosen to maximize the extinction ratio, although the relative importance of optical transmission and reflection for the different polarizations may vary for different applications.

In another aspect, the present invention relates to an optical body comprising a continuous phase, a disperse phase whose index of refraction differs from said continuous phase by greater than about 0.05 along a first axis and by less than about 0.05 along a second axis orthogonal to said first axis, and a dichroic dye. The optical body is preferably oriented along at least one axis. The dichroic dye improves the extinction coefficient of the optical body by absorbing, in addition to scattering, light polarized parallel to the axis of orientation.

In the various aspects of the present invention, the reflection and transmission properties for at least two orthogonal polarizations of incident light are determined by the selection or manipulation of various parameters, including the optical indices of the continuous and disperse phases, the size and shape of the disperse phase particles, the volume fraction of the disperse phase, the thickness of the optical body through which some fraction of the incident light is to pass, and the wavelength or wavelength band of electromagnetic radiation of interest.

The magnitude of the index match or mismatch along a particular axis will directly affect the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

The size of the disperse phase also can have a significant effect on scattering. If the disperse phase particles are too small (i.e., less than about 1/30 the wavelength of light in the medium of interest) and if there are many particles per cubic wavelength, the optical body behaves as a medium with an effective index of refraction somewhat between the indices of the two phases along any given axis. In such a case, very little light is scattered. If the particles are too large, the light is specularly reflected from the particle surface, with very little diffusion into other directions. When the particles are too large in at least two orthogonal directions, undesirable iridescence effects can also occur. Practical limits may also be reached when particles become large in that the thickness of the optical body becomes greater and desirable mechanical properties are compromised.

The shape of the particles of the disperse phase can also have an effect on the scattering of light. The depolarization factors of the particles for the electric field in the index of refraction match and mismatch directions can reduce or enhance the amount of scattering in a given direction. The effect can either add or detract from the amount of scattering from the index mismatch, but generally has a small influence on scattering in the preferred range of properties in the present invention.

The shape of the particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger. In general, in the operation of this invention, the disperse phase particles should be sized less than several wavelengths of light in one or two mutually orthogonal dimensions if diffuse, rather than specular, reflection is preferred.

Dimensional alignment is also found to have an effect on the scattering behavior of the disperse phase. In particular, it has been observed, in optical bodies made in accordance with the present invention, that aligned scatterers will not scatter light symmetrically about the directions of specular transmission or reflection as randomly aligned scatterers would. In particular, inclusions that have been elongated by orientation to resemble rods scatter light primarily along (or near) a cone centered on the orientation direction and having an edge along the specularly transmitted direction. For example, for light incident on such an elongated rod in a direction perpendicular to the orientation direction, the scattered light appears as a band of light in the plane perpendicular to the orientation direction with an intensity that decreases with increasing angle away from the specular directions. By tailoring the geometry of the inclusions, some control over the distribution of scattered light can be achieved both in the transmissive hemisphere and in the reflective hemisphere.

The volume fraction of the disperse phase also affects the scattering of light in the optical bodies of the present invention. Within certain limits, increasing the volume fraction of the disperse phase tends to increase the amount of scattering that a light ray experiences after entering the body for both the match and mismatch directions of polarized light. This factor is important for controlling the reflection and transmission properties for a given application. However, if the volume fraction of the disperse phase becomes too large, light scattering diminishes. Without wishing to be bound by theory, this appears to be due to the fact that the disperse phase particles are closer together, in terms of the wavelength of light, so that the particles tend to act together as a smaller number of large effective particles.

The thickness of the optical body is also an important control parameter which can be manipulated to affect reflection and transmission properties in the present invention. As the thickness of the optical body increases, diffuse reflection also increases, and transmission, both specular and diffuse, decreases.

While the present invention will often be described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body are increased so that the dimensions, measured in units of wavelength, remain approximately constant. Another major effect of changing wavelength is that, for most materials of interest, the index of refraction and the absorption coefficient change. However, the principles of index match and mismatch still apply at each wavelength of interest.

DETAILED DESCRIPTION OF THE INVENTION

Introduction

As used herein, the terms "specular reflection" and "specular reflectance" refer to the reflectance of light rays into an emergent cone with a vertex angle of 16 degrees centered around the specular angle. The terms "diffuse reflection" or "diffuse reflectance" refer to the reflection of rays that are outside the specular cone defined above. The terms "total reflectance" or "total reflection" refer to the combined reflectance of all light from a surface. Thus, total reflection is the sum of specular and diffuse reflection.

Similarly, the terms "specular transmission" and "specular transmittance" are used herein in reference to the transmission of rays into an emergent cone with a vertex angle of 16 degrees centered around the specular direction. The terms "diffuse transmission" and "diffuse transmittance" are used herein in reference to the transmission of all rays that are outside the specular cone defined above. The terms "total transmission" or "total transmittance" refer to the combined transmission of all light through an optical body. Thus, total transmission is the sum of specular and diffuse transmission.

As used herein, the term "extinction ratio" is defined to mean the ratio of total light transmitted in one polarization to the light transmitted in an orthogonal polarization.

Figure 2:
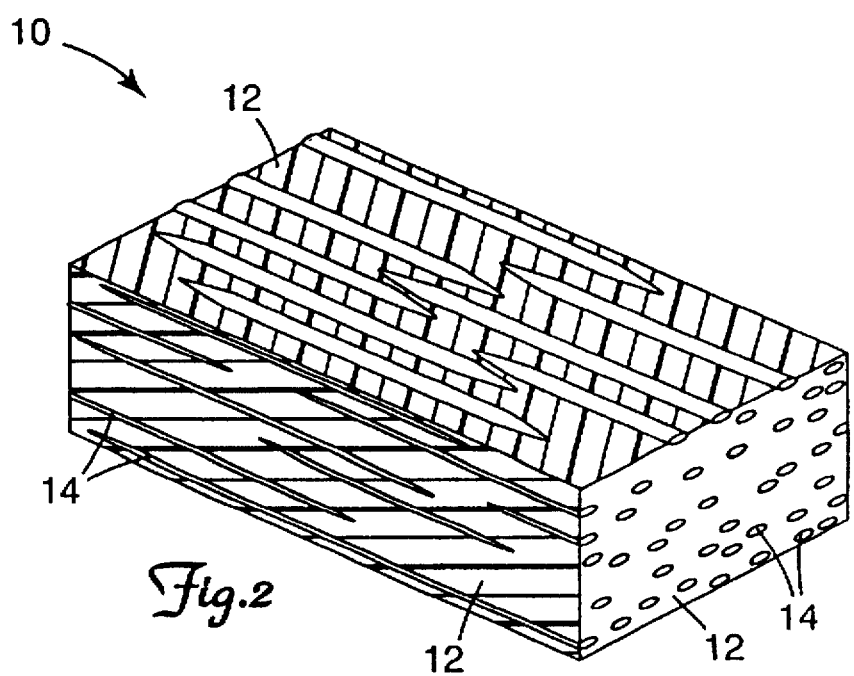
FIG. 2 is a schematic drawing illustrating an optical body made in accordance with the present invention, wherein the disperse phase is arranged as a series of elongated masses having an essentially elliptical cross-section.
Figure 3A:
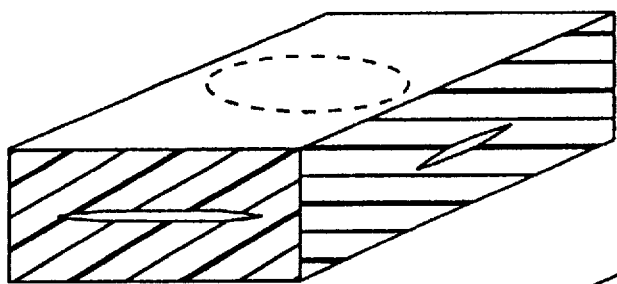
FIGS. 3a–e are schematic drawings illustrating various shapes of the disperse phase in an optical body made in accordance with the present invention.
Figure 3B:
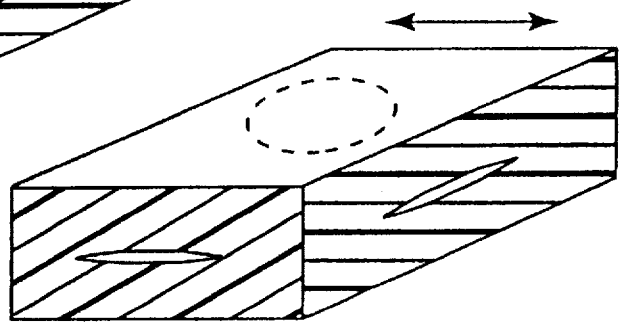
Figure 3C:
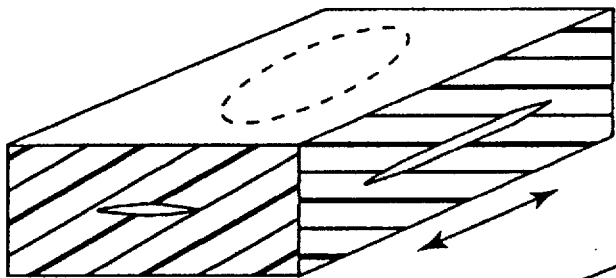
Figure 3D:
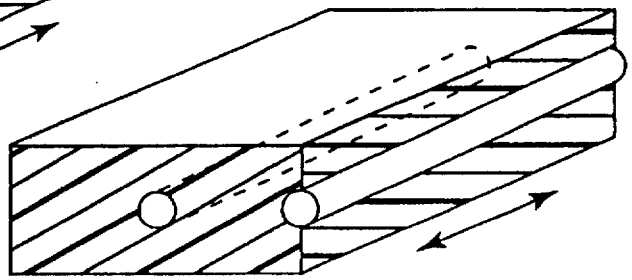
Figure 3E:
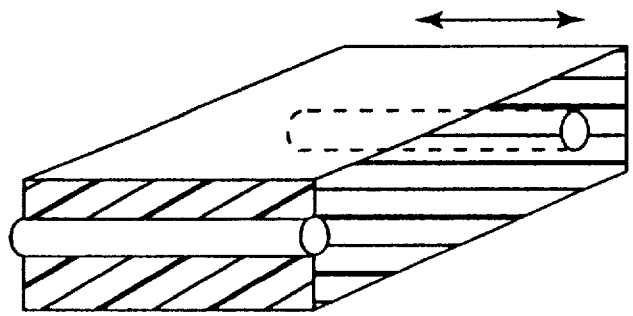

FIGS. 1–2 illustrate a first embodiment of the present invention. In accordance with the invention, a diffusely reflective optical film 10 or other optical body is produced which consists of a birefringent matrix or continuous phase 12 and a discontinuous or disperse phase 14. The birefringence of the continuous phase is typically at least about 0.05, preferably at least about 0.1, more preferably at least about 0.15, and most preferably at least about 0.2.

The indices of refraction of the continuous and disperse phases are substantially matched (i.e., differ by less than about 0.05) along a first of three mutually orthogonal axes, and are substantially mismatched (i.e., differ by more than about 0.05) along a second of three mutually orthogonal axes. Preferably, the indices of refraction of the continuous and disperse phases differ by less than about 0.03 in the match direction, more preferably, less than about 0.02, and most preferably, less than about 0.01. The indices of refraction of the continuous and disperse phases preferably differ in the mismatch direction by at least about 0.07, more preferably, by at least about 0.1, and most preferably, by at least about 0.2.

The mismatch in refractive indices along a particular axis has the effect that incident light polarized along that axis will be substantially scattered, resulting in a significant amount of reflection. By contrast, incident light polarized along an axis in which the refractive indices are matched will be spectrally transmitted or reflected with a much lesser degree of scattering. This effect can be utilized to make a variety of optical devices, including reflective polarizers and mirrors.

The present invention provides a practical and simple optical body and method for making a reflective polarizer, and also provides a means of obtaining a continuous range of optical properties according to the principles described herein. Also, very efficient low loss polarizers can be obtained with high extinction ratios. Other advantages are a wide range of practical materials for the disperse phase and the continuous phase, and a high degree of control in providing optical bodies of consistent and predictable high quality performance.

Effect of Index Match/Mismatch

In the preferred embodiment, the materials of at least one of the continuous and disperse phases are of a type that undergoes a change in refractive index upon orientation. Consequently, as the film is oriented in one or more directions, refractive index matches or mismatches are produced along one or more axes. By careful manipulation of orientation parameters and other processing conditions, the positive or negative birefringence of the matrix can be used to induce diffuse reflection or transmission of one or both polarizations of light along a given axis. The relative ratio between transmission and diffuse reflection is dependent on the concentration of the disperse phase inclusions, the thickness of the film, the square of the difference in the index of refraction between the continuous and disperse phases, the size and geometry of the disperse phase inclusions, and the wavelength or wavelength band of the incident radiation.

The magnitude of the index match or mismatch along a particular axis directly affects the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

Figure 4A:
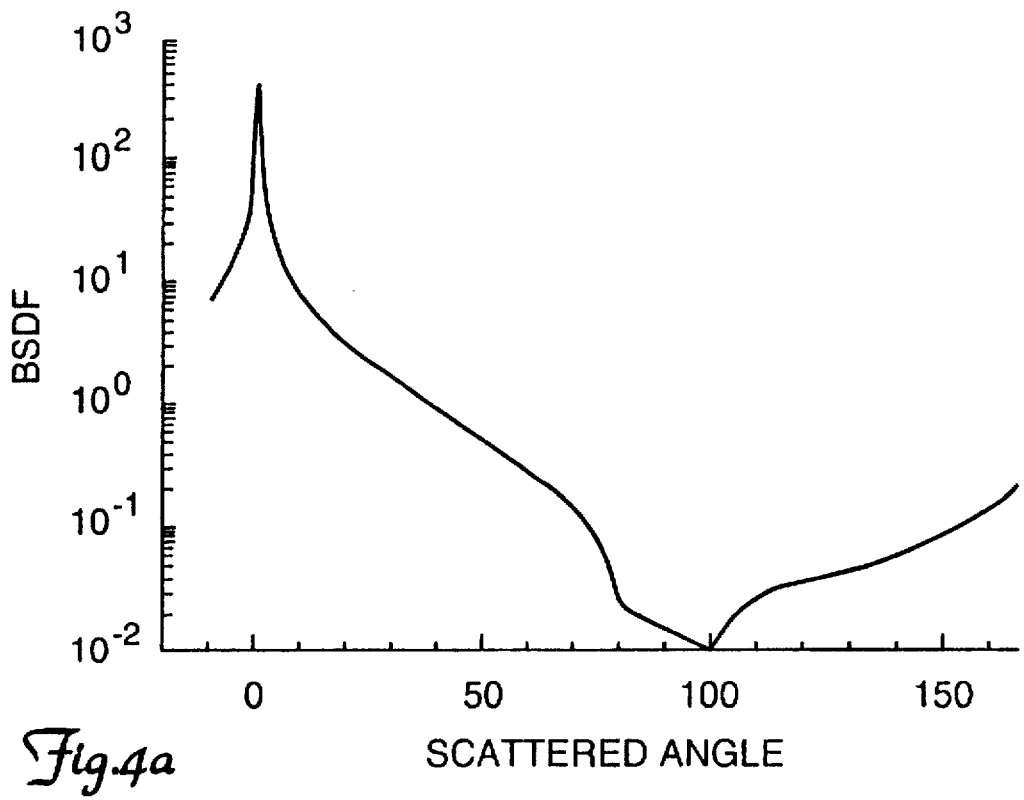
FIG. 4a is a graph of the bidirectional scatter distribution as a function of scattered angle for an oriented film in accordance with the present invention for light polarized perpendicular to orientation direction.
Figure 4B:
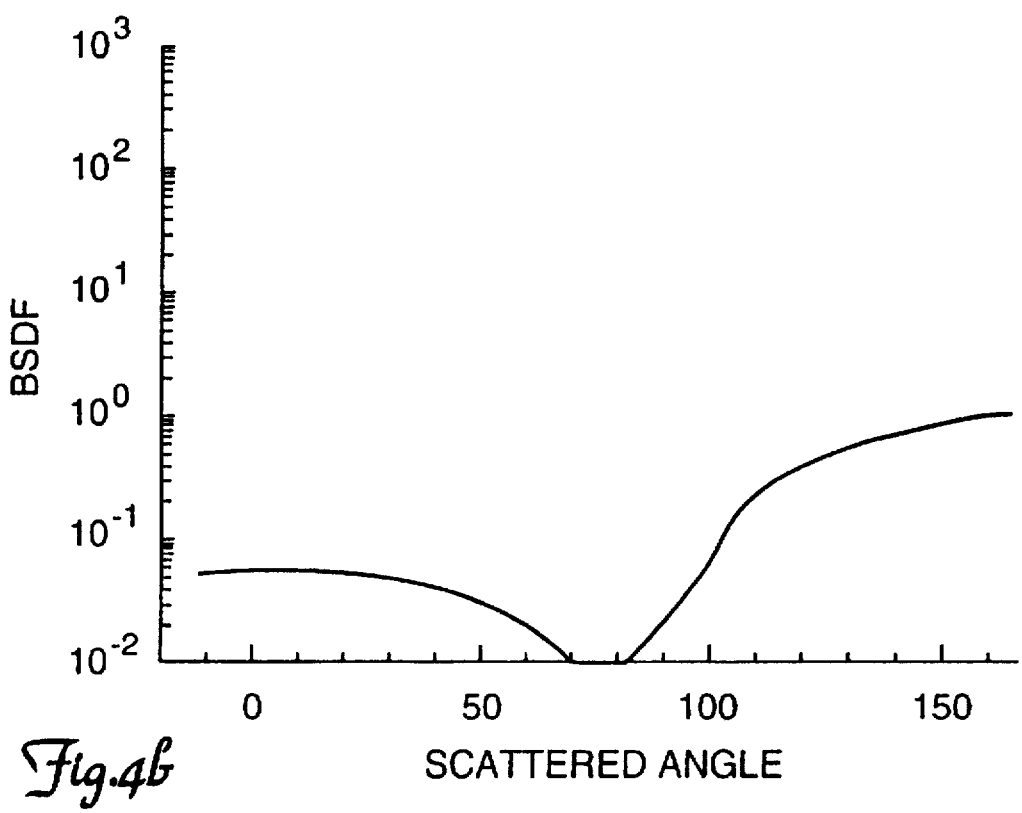
FIG. 4b is a graph of the bidirectional scatter distribution as a function of scattered angle for an oriented film in accordance with the present invention for light polarized parallel to orientation direction.

FIGS. 4a–b demonstrate this effect in oriented films made in accordance with the present invention. There, a typical Bidirectional Scatter Distribution Function (BSDF) measurement is shown for normally incident light at 632.8 nm. The BSDF is described in J. Stover, "Optical Scattering Measurement and Analysis" (1990). The BSDF is shown as a function of scattered angle for polarizations of light both perpendicular and parallel to the axis of orientation. A scattered angle of zero corresponds to unscattered (spectrally transmitted) light. For light polarized in the index match direction (that is, perpendicular to the orientation direction) as in FIG. 4a, there is a significant specularly transmitted peak with a sizable component of diffusely transmitted light (scattering angle between 8 and 80 degrees), and a small component of diffusely reflected light (scattering angle larger than 100 degrees). For light polarized in the index mismatch direction (that is, parallel to the orientation direction) as in FIG. 4b, there is negligible specularly transmitted light and a greatly reduced component of diffusely transmitted light, and a sizable diffusely reflected component. It should be noted that the plane of scattering shown by these graphs is the plane perpendicular to the orientation direction where most of the scattered light exists for these elongated inclusions. Scattered light contributions outside of this plane are greatly reduced.

If the index of refraction of the inclusions (i.e., the disperse phase) matches that of the continuous host media along some axis, then incident light polarized with electric fields parallel to this axis will pass through unscattered regardless of the size, shape, and density of inclusions. If the indices are not matched along some axis, then the inclusions will scatter light polarized along this axis. For scatterers of a given cross-sectional area with dimensions larger than approximately λ/30 (where λ is the wavelength of light in the media), the strength of the scattering is largely determined by the index mismatch. The exact size, shape and alignment of a mismatched is inclusion play a role in determining how much light will be scattered into various directions from that inclusion. If the density and thickness of the scattering layer is sufficient, according to multiple scattering theory, incident light will be either reflected or absorbed, but not transmitted, regardless of the details of the scatterer size and shape.

When the material is to be used as a polarizer, it is preferably processed, as by stretching and allowing some dimensional relaxation in the cross stretch in-plane direction, so that the index of refraction difference between the continuous and disperse phases is large along a first axis in a plane parallel to a surface of the material and small along the other two orthogonal axes. This results in a large optical anisotropy for electromagnetic radiation of different polarizations.

Some of the polarizers within the scope of the present invention are elliptical polarizers. In general, elliptical polarizers will have a difference in index of refraction between the disperse phase and the continuous phase for both the stretch and crossstretch directions. The ratio of forward to back scattering is dependent on the difference in refractive index between the disperse and continuous phases, the concentration of the disperse phase, the size and shape of the disperse phase, and the overall thickness of the film. In general, elliptical diffusers have a relatively small difference in index of refraction between the particles of the disperse and continuous phases. By using a birefringent polymer-based diffuser, highly elliptical polarization sensitivity (i.e., diffuse reflectivity depending on the polarization of light) can be achieved. At an extreme, where the index of refraction of the polymers match on one axis, the elliptical polarizer will be a diffuse reflecting polarizer.

Methods of Obtaining Index Match/Mismatch

The materials selected for use in a polarizer in accordance with the present invention, and the degree of orientation of these materials, are preferably chosen so that the phases in the finished polarizer have at least one axis for which the associated indices of refraction are substantially equal. The match of refractive indices associated with that axis, which typically, but not necessarily, is an axis transverse to the direction of orientation, results in substantially no reflection of light in that plane of polarization.

The disperse phase may also exhibit a decrease in the refractive index associated with the direction of orientation after stretching. If the birefringence of the host is positive, a negative strain induced birefringence of the disperse phase has the advantage of increasing the difference between indices of refraction of the adjoining phases associated with the orientation axis while the reflection of light with its plane of polarization perpendicular to the orientation direction is still negligible. Differences between the indices of refraction of adjoining phases in the direction orthogonal to the orientation direction should be less than about 0.05 after orientation, and preferably, less than about 0.02.

The disperse phase may also exhibit a positive strain induced birefringence. However, this can be altered by means of heat treatment to match the refractive index of the axis perpendicular to the orientation direction of the continuous phase. The temperature of the heat treatment should not be so high as to relax the birefringence in the continuous phase.

Size of Disperse Phase

The size of the disperse phase also can have a significant effect on scattering. If the disperse phase particles are too small (i.e., less than about 1/30 the wavelength of light in the medium of interest) and if there are many particles per cubic wavelength, the optical body behaves as a medium with an effective index of refraction somewhat between the indices of the two phases along any given axis. In such a case, very little light is scattered. If the particles are too large, the light is specularly reflected from the surface of the particle, with very little diffusion into other directions. When the particles are too large in at least two orthogonal directions, undesirable iridescence effects can also occur. Practical limits may also be reached when particles become large in that the thickness of the optical body becomes greater and desirable mechanical properties are compromised.

The dimensions of the particles of the disperse phase after alignment can vary depending on the desired use of the optical material. Thus, for example, the dimensions of the particles may vary depending on the wavelength of electromagnetic radiation that is of interest in a particular application, with different dimensions required for reflecting or transmitting visible, ultraviolet, infrared, and microwave radiation. Generally, however, the length of the particles should be such that they are approximately greater than the wavelength of electromagnetic radiation of interest in the medium, divided by 30.

Preferably, in applications where the optical body is to be used as a low loss reflective polarizer, the particles will have a length that is greater than about 2 times the wavelength of the electromagnetic radiation over the wavelength range of interest, and preferably over 4 times the wavelength. The average diameter of the particles is preferably equal or less than the wavelength of the electromagnetic radiation over the wavelength range of interest, and preferably less than 0.5 of the desired wavelength. While the dimensions of the disperse phase are a secondary consideration in most applications, they become of greater importance in thin film applications, where there is comparatively little diffuse reflection.

Geometry of Disperse Phase

While the index mismatch is the predominant factor relied upon to promote scattering in the films of the present invention (i.e., a diffuse mirror or polarizer made in accordance with the present invention has a substantial mismatch in the indices of refraction of the continuous and disperse phases along at least one axis), the geometry of the particles of the disperse phase can have a secondary effect on scattering. Thus, the depolarization factors of the particles for the electric field in the index of refraction match and mismatch directions can reduce or enhance the amount of scattering in a given direction. For example, when the disperse phase is elliptical in a cross-section taken along a plane perpendicular to the axis of orientation, the elliptical cross-sectional shape of the disperse phase contributes to the asymmetric diffusion in both back scattered light and forward scattered light. The effect can either add or detract from the amount of scattering from the index mismatch, but generally has a small influence on scattering in the preferred range of properties in the present invention.

The shape of the disperse phase particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger. In general, in the operation of this invention, the disperse phase particles should be sized less than several wavelengths of light in one or two mutually orthogonal dimensions if diffuse, rather than specular, reflection is preferred.

Preferably, for a low loss reflective polarizer, the preferred embodiment consists of a disperse phase disposed within the continuous phase as a series of rod-like structures which, as a consequence of orientation, have a high aspect ratio which can enhance reflection for polarizations parallel to the orientation direction by increasing the scattering strength and dispersion for that polarization relative to polarizations perpendicular to the orientation direction. However, as indicated in FIGS. 3a–e, the disperse phase may be provided with many different geometries. Thus, the disperse phase may be disk-shaped or elongated disk-shaped, as in FIGS. 3a–c, rod-shaped, as in FIG. 3d–e, or spherical. Other embodiments are contemplated wherein the disperse phase has cross sections which are approximately elliptical (including circular), polygonal, irregular, or a combination of one or more of these shapes. The cross-sectional shape and size of the particles of the disperse phase may also vary from one particle to another, or from one region of the film to another (i.e., from the surface to the core).

In some embodiments, the disperse phase may have a core and shell construction, wherein the core and shell are made out of the same or different materials, or wherein the core is hollow. Thus, for example, the disperse phase may consist of hollow fibers of equal or random lengths, and of uniform or non-uniform cross section. The interior space of the fibers may be empty, or may be occupied by a suitable medium which may be a solid, liquid, or gas, and may be organic or inorganic. The refractive index of the medium may be chosen in consideration of the refractive indices of the disperse phase and the continuous phase so as to achieve a desired optical effect (i.e., reflection or polarization along a given axis).

The geometry of the disperse phase may be arrived at through suitable orientation or processing of the optical material, through the use of particles having a particular geometry, or through a combination of the two. Thus, for example, a disperse phase having a substantially rod-like structure can be produced by orienting a film consisting of approximately spherical disperse phase particles along a single axis. The rod-like structures can be given an elliptical cross-section by orienting the film in a second direction perpendicular to the first. As a further example, a disperse phase having a substantially rod-like structure in which the rods are rectangular in cross-section can be produced by orienting in a single direction a film having a disperse phase consisting of a series of essentially rectangular flakes.

Stretching is one convenient manner for arriving at a desired geometry, since stretching can also be used to induce a difference in indices of refraction within the material. As indicated above, the orientation of films in accordance with the invention may be in more than one direction, and may be sequential or simultaneous.

In another example, the components of the continuous and disperse phases may be extruded such that the disperse phase is rod-like in one axis in the unoriented film. Rods with a high aspect ratio may be generated by orienting in the direction of the major axis of the rods in the extruded film. Plate-like structures may be generated by orienting in an orthogonal direction to the major axis of the rods in the extruded film.

The structure in FIG. 2 can be produced by asymmetric biaxial orientation of a blend of essentially spherical particles within a continuous matrix. Alternatively, the structure may be obtained by incorporating a plurality of fibrous structures into the matrix material, aligning the structures along a single axis, and orienting the mixture in a direction transverse to that axis. Still another method for obtaining this structure is by controlling the relative viscosities, shear, or surface tension of the components of a polymer blend so as to give rise to a fibrous disperse phase when the blend is extruded into a film. In general, it is found that the best results are obtained when the shear is applied in the direction of extrusion.

Dimensional Alignment of Disperse Phase

Dimensional alignment is also found to have an effect on the scattering behavior of the disperse phase. In particular, it has been observed in optical bodies made in accordance with the present invention that aligned scatterers will not scatter light symmetrically about the directions of specular transmission or reflection as randomly aligned scatterers would. In particular, inclusions that have been elongated through orientation to resemble rods scatter light primarily along (or near) the surface of a cone centered on the orientation direction and along the specularly transmitted direction. This may result in an anisotropic distribution of scattered light about the specular reflection and specular transmission directions. For example, for light incident on such an elongated rod in a direction perpendicular to the orientation direction, the scattered light appears as a band of light in the plane perpendicular to the orientation direction with an intensity that decreases with increasing angle away from the specular directions. By tailoring the geometry of the inclusions, some control over the distribution of scattered light can be achieved both in the transmissive hemisphere and in the reflective hemisphere.

Dimensions of Disperse Phase

In applications where the optical body is to be used as a low loss reflective polarizer, the structures of the disperse phase preferably have a high aspect ratio, i.e., the structures are substantially larger in one dimension than in any other dimension. The aspect ratio is preferably at least 2, and more preferably at least 5. The largest dimension (i.e., the length) is preferably at least 2 times the wavelength of the electromagnetic radiation over the wavelength range of interest, and more preferably at least 4 times the desired wavelength. On the other hand, the smaller (i.e., cross-sectional) dimensions of the structures of the disperse phase are preferably less than or equal to the wavelength of interest, and more preferably less than 0.5 times the wavelength of interest.

Volume Fraction of Disperse Phase

The volume fraction of the disperse phase also affects the scattering of light in the optical bodies of the present invention. Within certain limits, increasing the volume fraction of the disperse phase tends to increase the amount of scattering that a light ray experiences after entering the body for both the match and mismatch directions of polarized light. This factor is important for controlling the reflection and transmission properties for a given application. However, if the volume fraction of the disperse phase becomes too large, light scattering can diminish. Without wishing to be bound by theory, this appears to be due to the fact that the disperse phase particles are closer together, in terms of the wavelength of light, so that the particles tend to act together as a smaller number of large effective particles.

The desired volume fraction of the disperse phase will depend on many factors, including the specific choice of materials for the continuous and disperse phase. However, the volume fraction of the disperse phase will typically be at least about 1% by volume relative to the continuous phase, more preferably within the range of about 5 to about 15%, and most preferably within the range of about 15 to about 30%.

Thickness of Optical Body

The thickness of the optical body is also an important parameter which can be manipulated to affect reflection and transmission properties in the present invention. As the thickness of the optical body increases, diffuse reflection also increases, and transmission, both specular and diffuse, decreases. Thus, while the thickness of the optical body will typically be chosen to achieve a desired degree of mechanical strength in the finished product, it can also be used to directly to control reflection and transmission properties.

Thickness can also be utilized to make final adjustments in reflection and transmission properties of the optical body. Thus, for example, in film applications, the device used to extrude the film can be controlled by a downstream optical device which measures transmission and reflection values in the extruded film, and which varies the thickness of the film (i.e., by adjusting extrusion rates or changing casting wheel speeds) so as to maintain the reflection and transmission values within a predetermined range.

Materials for Continuous/Disperse Phases

Many different materials may be used as the continuous or disperse phases in the optical bodies of the present invention, depending on the specific application to which the optical body is directed. Such materials include inorganic materials such as silica-based polymers, organic materials such as liquid crystals, and polymeric materials, including monomers, copolymers, grafted polymers, and mixtures or blends thereof The exact choice of materials for a given application will be driven by the desired match and mismatch obtainable in the refractive indices of the continuous and disperse phases along a particular axis, as well as the desired physical properties in the resulting product. However, the materials of the continuous phase will generally be characterized by being substantially transparent in the region of the spectrum desired.

A further consideration in the choice of materials is that the resulting product must contain at least two distinct phases. This may be accomplished by casting the optical material from two or more materials which are immiscible with each other.

Alternatively, if it is desired to make an optical material with a first and second material which are not immiscible with each other, and if the first material has a higher melting point than the second material, in some cases it may be possible to embed particles of appropriate dimensions of the first material within a molten matrix of the second material at a temperature below the melting point of the first material.

The resulting mixture can then be cast into a film, with or without subsequent orientation, to produce an optical device.

Suitable polymeric materials for use as the continuous or disperse phase in the present invention may be amorphous, semicrystalline, or crystalline polymeric materials, including materials made from monomers based on carboxylic acids such as isophthalic, azelaic, adipic, sebacic, dibenzoic, terephthalic, 2,7-naphthalene dicarboxylic, 2,6-naphthalene dicarboxylic, cyclohexanedicarboxylic, and bibenzoic acids (including 4,4'-bibenzoic acid), or materials made from the corresponding esters of the aforementioned acids (i.e., dimethylterephthalate). Of these, 2,6-polyethylene naphthalate (PEN) is especially preferred because of its strain induced birefringence, and because of its ability to remain permanently birefringent after stretching. PEN has a refractive index for polarized incident light of 550 nm wavelength which increases after stretching when the plane of polarization is parallel to the axis of stretch from about 1.64 to as high as about 1.9, while the refractive index decreases for light polarized perpendicular to the axis of stretch. PEN exhibits a birefringence (in this case, the difference between the index of refraction along the stretch direction and the index perpendicular to the stretch direction) of 0.25 to 0.40 in the visible spectrum. The birefringence can be increased by increasing the molecular orientation. PEN may be substantially heat stable from about 155° C. up to about 230° C., depending upon the processing conditions utilized during the manufacture of the film.

Polybutylene naphthalate is also a suitable material as well as other crystalline naphthalene dicarboxylic polyesters. The crystalline naphthalene dicarboxylic polyesters exhibit a difference in refractive indices associated with different in-plane axes of at least 0.05 and preferably above 0.20.

When PEN is used as one phase in the optical material of the present invention, the other phase is preferably polymethylmethacrylate (PMMA) or a syndiotactic vinyl aromatic polymer such as polystyrene (sPS). Other preferred polymers for use with PEN are based on terephthalic, isophthalic, sebacic, azelaic or cyclohexanedicarboxylic acid or the related alkyl esters of these materials. Naphthalene dicarboxylic acid may also be employed in minor amounts to improve adhesion between the phases. The diol component may be ethylene glycol or a related diol. Preferably, the index of refraction of the selected polymer is less than about 1.65, and more preferably, less than about 1.55, although a similar result may be obtainable by using a polymer having a higher index of refraction if the same index difference is achieved.

Syndiotactic-vinyl aromatic polymers useful in the current invention include poly(styrene), poly(alkyl styrene), poly(styrene halide), poly(alkyl styrene), poly(vinyl ester benzoate), and these hydrogenated polymers and mixtures, or copolymers containing these structural units. Examples of poly(alkyl styrenes) include: poly(methyl styrene), poly(ethyl styrene), poly(propyl styrene), poly(butyl styrene), poly(phenyl styrene), poly(vinyl naphthalene), poly(vinylstyrene), and poly(acenaphthalene) may be mentioned. As for the poly(styrene halides), examples include: poly(chlorostyrene), poly(bromostyrene), and poly(fluorostyrene). Examples of poly(alkoxy styrene) include: poly(methoxy styrene), and poly(ethoxy styrene). Among these examples, as particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene may be mentioned.

Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

The syndiotactic-vinyl aromatic polymers of the present invention may be block copolymers, random copolymers, or alternating copolymers.

The vinyl aromatic polymer having high level syndiotactic structure referred to in this invention generally includes polystyrene having syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of this syndiotactic-vinyl aromatic group polymer, preferably, the weight average molecular weight is greater than 10,000 and less than 1,000,000, and more preferably, greater than 50,000 and less than 800,000.

As for said other resins, various types may be mentioned, including, for instance, vinyl aromatic group polymers with atactic structures, vinyl aromatic group polymers with isotactic structures, and all polymers that are miscible. For example, polyphenylene ethers show good miscibility with the previous explained vinyl aromatic group polymers. Furthermore, the composition of these miscible resin components is preferably between 70 to 1 weight %, or more preferably, 50 to 2 weight %. When composition of miscible resin component exceeds 70 weight %, degradation on the heat resistance may occur, and is usually not desirable.

It is not required that the selected polymer for a particular phase be a copolyester or copolycarbonate. Vinyl polymers and copolymers made from monomers such as vinyl naphthalenes, styrenes, ethylene, maleic anhydride, acrylates, and methacrylates may also be employed. Condensation polymers, other than polyesters and polycarbonates, can also be utilized. Suitable condensation polymers include polysulfones, polyamides, polyurethanes, polyamic acids, and polyimides. Naphthalene groups and halogens such as chlorine, bromine and iodine are useful in increasing the refractive index of the selected polymer to the desired level (1.59 to 1.69) if needed to substantially match the refractive index if PEN is the host. Acrylate groups and fluorine are particularly useful in decreasing the refractive index.

Minor amounts of comonomers may be substituted into the naphthalene dicarboxylic acid polyester so long as the large refractive index difference in the orientation direction (s) is not substantially compromised. A smaller index difference (and therefore decreased reflectivity) may be counterbalanced by advantages in any of the following: improved adhesion between the continuous and disperse phase, lowered temperature of extrusion, and better match of melt viscosities.

Region of Spectrum

While the present invention is frequently described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body may be increased so that the dimensions of these components, measured in units of wavelength, remain approximately constant.

Of course, one major effect of changing wavelength is that, for most materials of interest, the index of refraction and the absorption coefficient change. However, the principles of index match and mismatch still apply at each wavelength of interest, and may be utilized in the selection of materials for an optical device that will operate over a specific region of the spectrum. Thus, for example, proper scaling of dimensions will allow operation in the infrared, near-ultraviolet, and ultra-violet regions of the spectrum. In these cases, the indices of refraction refer to the values at these wavelengths of operation, and the body thickness and size of the disperse phase scattering components should also be approximately scaled with wavelength. Even more of the electromagnetic spectrum can be used, including very high, ultrahigh, microwave and millimeter wave frequencies. Polarizing and diffusing effects will be present with proper scaling to wavelength and the indices of refraction can be obtained from the square root of the dielectric function (including real and imaginary parts). Useful products in these longer wavelength bands can be diffuse reflective polarizers and partial polarizers.

In some embodiments of the present invention, the optical properties of the optical body vary across the wavelength band of interest. In these embodiments, materials may be utilized for the continuous and/or disperse phases whose indices of refraction, along one or more axes, varies from one wavelength region to another. The choice of continuous and disperse phase materials, and the optical properties (i.e., diffuse and disperse reflection or specular transmission) resulting from a specific choice of materials, will depend on the wavelength band of interest.

Skin Layers

A layer of material which is substantially free of a disperse phase may be coextensively disposed on one or both major surfaces of the film, i.e., the extruded blend of the disperse phase and the continuous phase. The composition of the layer, also called a skin layer, may be chosen, for example, to protect the integrity of the disperse phase within the extruded blend, to add mechanical or physical properties to the final film or to add optical functionality to the final film. Suitable materials of choice may include the material of the continuous phase or the material of the disperse phase. Other materials with a melt viscosity similar to the extruded blend may also be useful.

A skin layer or layers may reduce the wide range of shear intensities the extruded blend might experience within the extrusion process, particularly at the die. A high shear environment may cause undesirable surface voiding and may result in a textured surface. A broad range of shear values throughout the thickness of the film may also prevent the disperse phase from forming the desired particle size in the blend.

A skin layer or layers may also add physical strength to the resulting composite or reduce problems during processing, such as, for example, reducing the tendency for the film to split during the orientation process. Skin layer materials which remain amorphous may tend to make films with a higher toughness, while skin layer materials which are semicrystalline may tend to make films with a higher tensile modulus. Other functional components such as antistatic additives, UV absorbers, dyes, antioxidants, and pigments, may be added to the skin layer, provided they do not substantially interfere with the desired optical properties of the resulting product.

The skin layers may be applied to one or two sides of the extruded blend at some point during the extrusion process, i.e., before the extruded blend and skin layer(s) exit the extrusion die. This may be accomplished using conventional coextrusion technology, which may include using a three-layer coextrusion die. Lamination of skin layer(s) to a previously formed film of an extruded blend is also possible. Total skin layer thicknesses may range from about 2% to about 50% of the total blend/skin layer thickness.

A wide range of polymers are suitable for skin layers. Predominantly amorphous polymers include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers are 2,6-polyethylene naphthalate, polyethylene terephthalate, and nylon materials.

Antireflection Layers

The films and other optical devices made in accordance with the invention may also include one or more anti-reflective layers. Such layers, which may or may not be polarization sensitive, serve to increase transmission and to reduce reflective glare. An anti-reflective layer may be imparted to the films and optical devices of the present invention through appropriate surface treatment, such as coating or sputter etching.

In some embodiments of the present invention, it is desired to maximize the transmission and/or minimize the specular reflection for certain polarizations of light. In these embodiments, the optical body may comprise two or more layers in which at least one layer comprises an anti-reflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective stack, graded index layers, and graded density layers. Such antireflection functions can also be used on the transmitted light side of the body to increase transmitted light if desired.

Microvoiding

In some embodiments, the materials of the continuous and disperse phases may be chosen so that the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the aspect ratios and refractive indices of the disperse and continuous phases to produce desirable optical properties in the resulting film.

More Than Two Phases

The optical bodies made in accordance with the present invention may also consist of more than two phases. Thus, for example, an optical material made in accordance with the present invention can consist of two different disperse phases within the continuous phase. The second disperse phase could be randomly or nonrandomly dispersed throughout the continuous phase, and can be randomly aligned or aligned along a common axis.

Optical bodies made in accordance with the present invention may also consist of more than one continuous phase. Thus, in some embodiments, the optical body may include, in addition to a first continuous phase and a disperse phase, a second phase which is co-continuous in at least one dimension with the first continuous phase. In one particular embodiment, the second continuous phase is a porous, sponge-like material which is coextensive with the first continuous phase (i.e., the first continuous phase extends through a network of channels or spaces extending through the second continuous phase, much as water extends through a network of channels in a wet sponge). In a related embodiment, the second continuous phase is in the form of a dendritic structure which is coextensive in at least one dimension with the first continuous phase.

Multilayer Combinations

If desired, one or more sheets of a continuous/disperse phase film made in accordance with the present invention may be used in combination with, or as a component in, a multilayered film (i.e., to increase reflectivity). Suitable multilayered films include those of the type described in WO 95/17303 (Ouderkirk et al.). In such a construction, the individual sheets may be laminated or otherwise adhered together or may be spaced apart. If the optical thicknesses of the phases within the sheets are substantially equal (that is, if the two sheets present a substantially equal and large number of scatterers to incident light along a given axis), the composite will reflect, at somewhat greater efficiency, substantially the same band width and spectral range of reflectivity (i.e., "band") as the individual sheets. If the optical thicknesses of phases within the sheets are not substantially equal, the composite will reflect across a broader band width than the individual phases. A composite combining mirror sheets with polarizer sheets is useful for increasing total reflectance while still polarizing transmitted light. Alternatively, a single sheet may be asymmetrically and biaxially oriented to produce a film having selective reflective and polarizing properties.

Figure 5:
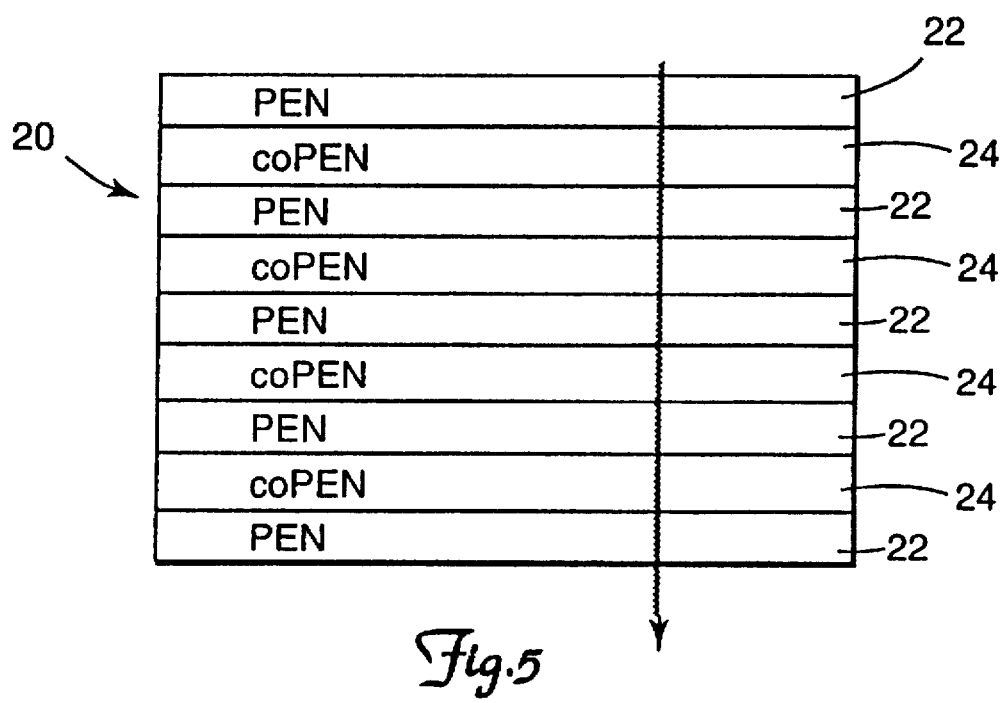
FIG. 5 is a schematic representation of a multilayer film made in accordance with the present invention.

FIG. 5 illustrates one example of this embodiment of the present invention. There, the optical body consists of a multilayer film 20 in which the layers alternate between layers of PEN 22 and layers of co-PEN 24. Each PEN layer includes a disperse phase of syndiotactic polystyrene (sPS) within a matrix of PEN. This type of construction is desirable in that it promotes lower off-angle color. Furthermore, since the layering or inclusion of scatterers averages out light leakage, control over layer thickness is less critical, allowing the film to be more tolerable of variations in processing parameters.

Any of the materials previously noted may be used as any of the layers in this embodiment, or as the continuous or disperse phase within a particular layer. However, PEN and co-PEN are particularly desirable as the major components of adjacent layers, since these materials promote good laminar adhesion.

Also, a number of variations are possible in the arrangement of the layers. Thus, for example, the layers can be made to follow a repeating sequence through part or all of the structure. One example of this is a construction having the layer pattern ...ABCABC..., wherein A, B, and C are distinct materials or distinct blends or mixtures of the same or different materials, and wherein one or more of A, B, or C contains at least one disperse phase and at least one continuous phase. The skin layers are preferably the same or chemically similar materials.

Additives

The optical materials of the present invention may also comprise other materials or additives as are known to the art. Such materials include pigments, dyes, binders, coatings, fillers, compatibilizers, antioxidants (including sterically hindered phenols), surfactants, antimicrobial agents, antistatic agents, flame retardants, foaming agents, lubricants, reinforcers, light stabilizers (including UV stabilizers or blockers), heat stabilizers, impact modifiers, plasticizers, viscosity modifiers, and other such materials. Furthermore, the films and other optical devices made in accordance with the present invention may include one or more outer layers which serve to protect the device from abrasion, impact, or other damage, or which enhance the processability or durability of the device.

Suitable lubricants for use in the present invention include calcium sterate, zinc sterate, copper sterate, cobalt sterate, molybdenum neodocanoate, and ruthenium (III) acetylacetonate.

Antioxidants useful in the present invention include 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis-(2,4-di-t-butylphenyl) pentaerythritol diphosphite, Irganox™ 1093 (1979)(((3,5-bis(1,1-dimethylethyl)-4-hydroxyphenyl)methyl)-dioctadecyl ester phosphonic acid), Irganox™ 1098 (N,N'-1,6-hexanediylbis(3,5-bis(1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (flourophosphonite), and 2,2'-ethylidenebis(4,6-di-t-butylphenyl)fluorophosnite.

A group of antioxidants that are especially preferred are sterically hindered phenols, including butylated hydroxytoluene (BHT), Vitamin E (di-alphatocopherol), Irganox™ 1425WL(calcium bis-(O-ethyl(3,5-di-t-butyl-4hydroxybenzyl))phosphonate), Irganox™ 1010 (tetrakis (methylene(3,5,di-t-butyl-4-hydroxyhydrocinnamate)) methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

Dichroic dyes are a particularly useful additive in some applications to which the optical materials of the present invention may be directed, due to their ability to absorb light of a particular polarization when they are molecularly aligned within the material. When used in a film or other material which predominantly scatters only one polarization of light, the dichroic dye causes the material to absorb one polarization of light more than another. Suitable dichroic dyes for use in the present invention include Congo Red (sodium diphenyl-bis-oc-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN.

Other suitable dyes include the following materials:

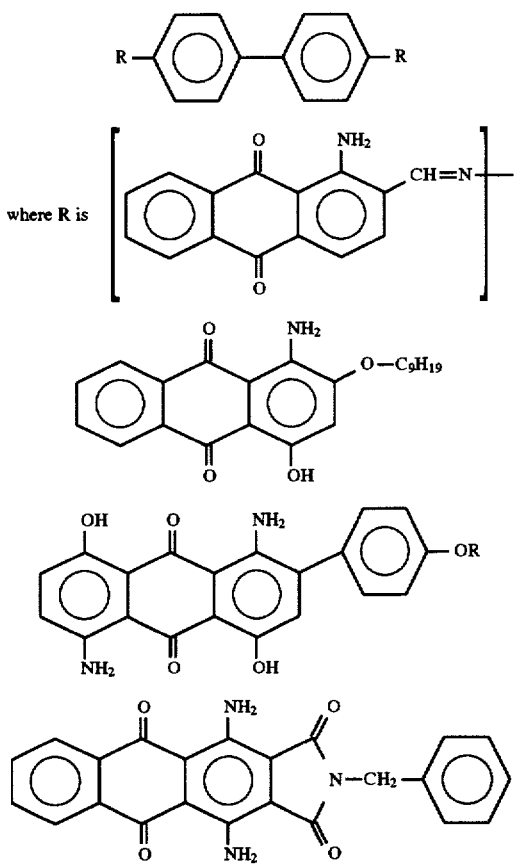

The properties of these dyes, and methods of making them, are discussed in the Kirk Othmer Encyclopedia of Chemical Technology, Vol. 8, pp. 652–661 (4th Ed. 1993), and in the references cited therein.

When a dichroic dye is used in the optical bodies of the present invention, it may be incorporated into either the continuous or disperse phase. However, it is preferred that the dichroic dye is incorporated into the disperse phase.

Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an s ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light.

Molecular alignment of a dichroic dye within an optical body made in accordance with the present invention is preferably accomplished by stretching the optical body after the dye has been incorporated into it. However, other methods may also be used to achieve molecular alignment. Thus, in one method, the dichroic dye is crystallized, as through sublimation or by crystallization from solution, into a series of elongated notches that are cut, etched, or otherwise formed in the surface of a film or other optical body, either before or after the optical body has been oriented. The treated surface may then be coated with one or more surface layers, may be incorporated into a polymer matrix or used in a multilayer structure, or may be utilized as a component of another optical body. The notches may be created in accordance with a predetermined pattern or diagram, and with a predetermined amount of spacing between the notches, so as to achieve desirable optical properties.

In a related embodiment, the dichroic dye may be disposed within one or more hollow fibers or other conduits, either before or after the hollow fibers or conduits are disposed within the optical body. The hollow fibers or conduits may be constructed out of a material that is the same or different from the surrounding material of the optical body.

In yet another embodiment, the dichroic dye is disposed along the layer interface of a multilayer construction, as by sublimation onto the surface of a layer before it is incorporated into the multilayer construction. In still other embodiments, the dichroic dye is used to at least partially backfill the voids in a microvoided film made in accordance with the present invention.

Applications of Present Invention

The optical bodies of the present invention are particularly useful as diffuse polarizers. However, optical bodies may also be made in accordance with the invention which operate as reflective polarizers or diffuse mirrors. In these applications, the construction of the optical material is similar to that in the diffuser applications described above. However, these reflectors will generally have a much larger difference in the index of refraction along at least one axis. This index difference is typically at least about 0.1, more preferably about 0.15, and most preferably about 0.2.

Reflective polarizers have a refractive index difference along one axis, and substantially matched indices along another. Reflective films, on the other hand, differ in refractive index along at least two in-film plane orthogonal axes. However, the reflective properties of these embodiments need not be attained solely by reliance on refractive index mismatches. Thus, for example, the thickness of the films could be adjusted to attain a desired degree of reflection. In some cases, adjustment of the thickness of the film may cause the film to go from being a transmissive diffuser to a diffuse reflector.

The reflective polarizer of the present invention has many different applications, and is particularly useful in liquid crystal display panels. In addition, the polarizer can be constructed out of PEN or similar materials which are good ultraviolet filters and which absorb ultraviolet light efficiently up to the edge of the visible spectrum. The reflective polarizer can also be used as a thin infrared sheet polarizer.

Overview of Examples

The following Examples illustrate the production of various optical materials in accordance with the present invention, as well as the spectral properties of these materials. Unless otherwise indicated, percent composition refers to percent composition by weight. The polyethylene naphthalate resin used was produced for these samples using ethylene glycol and dimethyl-2,6-naphthalenedicarboxylate, available from Amoco Corp., Chicago, Ill. These reagents were polymerized to various intrinsic viscosities (IV) using conventional polyester resin polymerization techniques. Syndiotactic polystyrene (sPS) may be produced in accordance with the method disclosed in U.S. Pat. No. 4,680,353 (Ishihara et al). The examples includes various polymer pairs, various fractions of continuous and disperse phases and other additives or process changes as discussed below.

Stretching or orienting of the samples was provided using either conventional orientation equipment used for making polyester film or a laboratory batch orienter. The laboratory batch orienter used was designed to use a small piece of cast material (7.5 cm by 7.5 cm) cut from the extruded cast web and held by a square array of 24 grippers (6 on each side).

The orientation temperature of the sample was controlled a hot air blower and the film sample was oriented through a mechanical system that increased the distance between the grippers in one or both directions at a controlled rate. Samples stretched in both directions could be oriented sequentially or simultaneously. For samples that were oriented in the constrained mode (C), all grippers hold the web and the grippers move only in one dimension. Whereas, in the unconstrained mode (U), the grippers that hold the film at a fixed dimension perpendicular to the direction of stretch are not engaged and the film is allowed to relax or neckdown in that dimension.

Polarized diffuse transmission and reflection were measured using a Perkin Elmer Lambda 19 ultraviolet/visible/ near infrared spectrophotometer equipped with a Perkin Elmer Labsphere S900-1000 150 millimeter integrating sphere accessory and a Glan-Thompson cube polarizer. Parallel and crossed transmission and reflection values were measured with the e-vector of the polarized light parallel or perpendicular, respectively, to the stretch direction of the film. All scans were continuous and were conducted with a scan rate of 480 nanometers per minute and a slit width of 2 nanometers. Reflection was performed in the "V-reflection" mode. Transmission and reflectance values are averages of all wavelengths from 400 to 700 nanometers.

EXAMPLE 1

In Example 1, an optical film was made in accordance with the invention by extruding a blend of 75% polyethylene naphthalate (PEN) as the continuous or major phase and 25% of polymethylmethacrylate (PMMA) as the disperse or minor phase into a cast film or sheet about 380 microns thick using conventional extrusion and casting techniques. The PEN had an intrinsic viscosity (IV) of 0.52 (measured in 60% phenol, 40% dichlorobenzene). The PMMA was obtained from ICI Americas, Inc., Wilmington, Del., under the product designation CP82. The extruder used was a 3.15 cm (1.24") Brabender with a 1 tube 60 μm Tegra filter. The die was a 30.4 cm (12") EDI Ultraflex™ 40.

About 24 hours after the film was extruded, the cast film was oriented in the width or transverse direction (TD) on a polyester film tentering device. The stretching was accomplished at about 9.1 meters per minute (30 ft/min) with an output width of about 140 cm (55 inches) and a stretching temperature of about 160° C. (320° F.). The total reflectivity of the stretched sample was measured with an integrating sphere attachment on a Lambda 19 spectrophotometer with the sample beam polarized with a Glan-Thompson cube polarizer. The sample had a 75% parallel reflectivity (i.e., reflectivity was measured with the stretch direction of the film parallel to the e-vector of the polarized light), and 52% crossed reflectivity (i.e., reflectivity was measured with the e-vector of the polarized light perpendicular to the stretch direction).

EXAMPLE 2

In Example 2, an optical film was made and evaluated in a manner similar to Example 1 except using a blend of 75% PEN, 25% syndiotactic polystyrene (sPS), 0.2% of a polystyrene glycidyl methacrylate compatibilizer, and 0.25% each of Irganox™ 1010 and Ultranox™ 626. The synthesis of polystyrene glycidyl methacrylate is described in Polymer Processes, "Chemical Technology of Plastics, Resins, Rubbers, Adhesives and Fibers", Vol. 10, Chap. 3, pp. 69–109 (1956)(Ed. by Calvin E. Schildknecht).

The PEN had an intrinsic viscosity of 0.52 measured in 60% phenol, 40% dichlorobenzene. The sPS was obtained from Dow Chemical Co. and had a weight average molecular weight of about 200.000, designated subsequently as sPS-200-0. The parallel reflectivity on the stretched film sample was determined to be 73.3%, and the crossed reflectivity was determined to be 35%.

EXAMPLE 3

In Example 3, an optical film was made and evaluated in a manner similar to Example 2 except the compatibilizer level was raised to 0.6%. The resulting parallel reflectivity was determined to be 81% and the crossed reflectivity was determined to be 35.6%.

EXAMPLE 4

In Example 4, an three layer optical film was made in accordance with the present invention utilizing conventional three layer coextrusion techniques. The film had a core layer and a skin layer on each side of the core layer. The core layer consisted of a blend of 75% PEN and 25% sPS 200-4 (the designation sPS-200-4 refers to a copolymer of syndiotacticpolystyrene containing 4 mole % of para-methyl styrene), and each skin layer consisted of 100% PEN having an intrinsic viscosity of 0.56 measured in 60% phenol, 40% dichlorobenzene.

The resulting three-layer cast film had a core layer thickness of about 415 microns, and each skin layer was about 110 microns thick for a total thickness of about 635 microns. A laboratory batch stretcher was used to stretch the resulting three-layer cast film about 6 to 1 in the machine direction (MD) at a temperature of about 129° C. Because the edges of the film sample parallel to the stretch direction were not gripped by the lab stretcher, the sample was unconstrained in the transverse direction (TD) and the sample neckeddown in the TD about 50% as a result of the stretch procedure.

Optical performance was evaluated in a manner similar to Example 1. The parallel reflectivity was determined to be 80.1%, and the crossed reflectivity was determined to be 15%. These results demonstrate that the film performs as a low absorbing, energy conserving system.

EXAMPLES 5–29

In Examples 5–29, a series of optical films were produced and evaluated in a manner similar to Example 4, except the sPS fraction in the core layer and the IV of the PEN resin used were varied as shown in Table 1. The IV of the PEN resin in the core layer and that in the skin layers was the same for a given sample. The total thickness of the cast sheet was about 625 microns with about two-thirds of this total in the core layer and the balance in the skin layers which were approximately equal in thickness. Various blends of PEN and sPS in the core layer were produced, as indicated in Table 1. The films were stretched to a stretch ratio of about 6:1 in either the machine direction (MD) or in the transverse direction (TD) at various temperatures as indicated in Table 1. Some of the samples were constrained (C) in the direction perpendicular to the stretch direction to prevent the sample from necking down during stretching. The samples labeled "U" in Table 1 were unconstrained and permitted to neckdown in the unconstrained dimension. Certain optical properties of the stretched samples, including percent transmission, reflection, and absorption, were measured along axes both parallel and crossed or perpendicular to the direction of stretch. The results are summarized in TABLE 1.

Heat setting, as indicated for Examples 24–27, was accomplished by manually constraining the two edges of the stretched sample which were perpendicular to the direction of stretch by clamping to an appropriately sized rigid frame and placing the clamped sample in an oven at the indicated temperature for 1 minute. The two sides of the sample parallel to the direction of stretch were unconstrained (U) or not clamped and allowed to neckdown. The heatsetting of Example 29 was similar except all four of the edges of the stretched sample were constrained (C) or clamped. Example 28 was not heat set.

% transmission was 79.5% and 20.3% in the parallel and perpendicular directions, respectively. By contrast, the transmission in Example 16 was only 75.8% and 28.7% in the parallel and perpendicular directions, respectively. There is a thickness increase relative to constrained stretching when samples are stretched unconstrained, but since both transmission and extinction improve, the index match is probably being improved.

An alternative way to provide refractive index control is to modify the chemistry of the materials. For example, a

TABLE 1

| Example Number | Stretch Temp. (°C.) | Stretch Direction (MD/TD) | Stretch Constrained (C/U) | PEN IV | Fraction (sPS) | Heat Set Temp. | Constrained Heat Set | Trans. (Perp.) | Trans. (Para.) | Reflec. (Perp.) | Reflec. (Para.) |
|---|---|---|---|---|---|---|---|---|---|---|---|
| 5 | 135 | TD | C | 0.53 | 0.25 | | | 76.2 | 20.4 | 22.6 | 75.3 |
| 6 | 135 | TD | C | 0.47 | 0.75 | | | 80.2 | 58.4 | 19.4 | 40 |
| 7 | 142 | TD | C | 0.53 | 0.25 | | | 74.2 | 21.8 | 25.3 | 77.3 |
| 8 | 142 | TD | C | 0.47 | 0.75 | | | 76.0 | 41.0 | 23.8 | 55.6 |
| 9 | 129 | TD | C | 0.53 | 0.25 | | | 71.2 | 21.2 | 26.5 | 76.2 |
| 10 | 129 | TD | C | 0.47 | 0.75 | | | 76.8 | 48.9 | 22.4 | 49.6 |
| 11 | 129 | MD | U | 0.53 | 0.25 | | | 81.5 | 27.6 | 17.2 | 67 |
| 12 | 129 | TD | U | 0.53 | 0.25 | | | 66.8 | 22.1 | 25 | 71.9 |
| 13 | 129 | MD | U | 0.47 | 0.25 | | | 79.5 | 20.3 | 19.3 | 73.7 |
| 14 | 129 | TD | U | 0.47 | 0.25 | | | 66.3 | 26.2 | 32.5 | 69.4 |
| 15 | 129 | TD | U | 0.47 | 0.5 | | | 73.0 | 26.2 | 24.7 | 68.7 |
| 16 | 129 | MD | U | 0.47 | 0.5 | | | 75.4 | 20.6 | 23.2 | 76.1 |
| 17 | 129 | MD | U | 0.47 | 0.1 | | | 82.1 | 27.3 | 16.9 | 67 |
| 18 | 129 | MD | U | 0.56 | 0.25 | | | 80.1 | 15.0 | 18 | 80.3 |
| 19 | 129 | TD | U | 0.56 | 0.25 | | | 70.2 | 21.6 | 25.2 | 70.7 |
| 20 | 129 | MD | C | 0.47 | 0.25 | | | 75.8 | 28.7 | 23.4 | 70.1 |
| 21 | 129 | MD | C | 0.47 | 0.5 | | | 79.8 | 27.8 | 19.7 | 70.8 |
| 22 | 135 | MD | C | 0.47 | 0.1 | | | 80.5 | 36.7 | 19.2 | 62.6 |
| 23 | 135 | MD | C | 0.53 | 0.25 | | | 77.2 | 21.1 | 21.8 | 76.6 |
| 24 | 129 | MD | U | 0.56 | 0.25 | 150 | U | 83.7 | 17.3 | 17.3 | 74 |
| 25 | 129 | MD | U | 0.56 | 0.25 | 220 | U | 82.1 | 16 | 18 | 75.8 |
| 26 | 129 | MD | U | 0.56 | 0.25 | 135 | U | 84.7 | 17 | 18 | 75.3 |
| 27 | 129 | MD | U | 0.56 | 0.25 | 165 | U | 83 | 16 | 16.5 | 76.3 |
| 28 | 129 | MD | U | 0.56 | 0.25 | CNTRL | | 83.7 | 17 | 17.5 | 76 |
| 29 | 129 | MD | U | 0.56 | 0.25 | 230 | C | | | | |
| 29 | 129 | MD | U | 0.56 | 0.25 | 230 | C | | | | |

All of the above samples were observed to contain varying shapes of the disperse phase depending on the location of the disperse phase within the body of the film sample. The disperse phase inclusions located nearer the surfaces of the samples were observed to be of an elongated shape rather than more nearly spherical. The inclusions which are more nearly centered between the surfaces of the samples may be more nearly spherical. This is true even for the samples with the skin layers, but the magnitude of the effect is reduced with the skin layers. The addition of the skin layers improves the processing of the films by reducing the tendency for splitting during the stretching operation.

Without wishing to be bound by theory, the elongation of the inclusions (disperse phase) in the core layer of the cast film is thought to be the result of shear on the blend as it is transported through the die. This elongation feature may be altered by varying physical dimensions of the die, extrusion temperatures, flow rate of the extrudate, as well as chemical aspects of the continuous and disperse phase materials which would alter their relative melt viscosities. Certain applications or uses may benefit from providing some elongation to the disperse phase during extrusion. For those applications which are subsequently stretched in the machine direction, starting with a disperse phase elongated during extrusion may allow a higher aspect ratio to be reached in the resulting disperse phase.

Another notable feature is the fact that a noticeable improvement in performance is observed when the same sample is stretched unconstrained. Thus, in Example 9, the copolymer of 30 wt % of interpolymerized units derived from terephthalic acid and 70 wt % of units derived from 2,6-naphthalic acid has a refractive index 0.02 units lower than a 100% PEN polymer. Other monomers or ratios may have slightly different results. This type of change may be used to more closely match the refractive indices in one axis while only causing a slight reduction in the axis which desires a large difference. In other words, the benefits attained by more closely matching the index values in one axis more than compensate for the reduction in an orthogonal axis in which a large difference is desired. Secondly, a chemical change may be desirable to alter the temperature range in which stretching occurs. A copolymer of sPS and varying ratios of para methyl styrene monomer will alter the optimum stretch-temperature range. A combination of these techniques may be necessary to most effectively optimize the total system for processing and resulting refractive index matches and differences. Thus, an improved control of the final performance may be attained by optimizing the process and chemistry in terms of stretching conditions and further adjusting the chemistry of the materials to maximize the difference in refractive index in at least one axis and minimizing the difference at least one orthogonal axis.

These samples displayed better optical performance if oriented in the MD rather than TD direction (compare Examples 14–15). Without wishing to be bound by theory, it is believed that different geometry inclusions are developed with an MD orientation than with a TD orientation and that these inclusions have higher aspect ratios, making non-ideal end effects less important. The non-ideal end effects refers to the complex geometry/index of refraction relationship at the tip of each end of the elongated particles. The interior or non-end of the particles are thought to have a uniform geometry and refractive index which is thought to be desirable. Thus, the higher the percentage of the elongated particle that is uniform, the better the optical performance.

The extinction ratio of these materials is the ratio of the transmission for polarizations perpendicular to the stretch direction to that parallel to the stretch direction. For the examples cited in Table 1, the extinction ratio ranges between about 2 and about 5, although extinction ratios up to 7 have been observed in optical bodies made in accordance with the present invention. It is expected that even higher extinction ratios can be achieved by adjusting film thickness, inclusion volume fraction, particle size, and the degree of index match and mismatch.

EXAMPLES 30–100

In Examples 30–100, samples of the invention were made using various materials as listed in Table 2. PEN 42, PEN 47, PEN 53, PEN 56, and PEN 60 refer to polyethylene naphthalate having an intrinsic viscosity (IV) of 0.42, 0.47, 0.53, 0.56, and 0.60, respectively, measured in 60% phenol, 40% dichlorobenzene. The particular sPS-200-4 used was obtained from Dow Chemical Co. Ecdel™ 9967 and Eastar™ are copolyesters which are available commercially from Eastman Chemical Co., Rochester, N.Y. Surlyn™ 1706 is an ionomer resin available from E. I. du Pont de Nemours & Co., Wilmington, Del. The materials listed as Additive 1 or 2 include polystyrene glycidyl methacrylate. The designations GMAPS2, GMAPS5, and GMAPS8 refer to glycidyl methacrylate having 2, 5, and 8% by weight, respectively, of glycidyl methacrylate in the total copolymer. ETPB refers to the crosslinking agent ethyltriphenylphosphonium bromide. PMMA VO44 refers to a polymethylmethacrylate available commercially from Atohaas North America, Inc.

The optical film samples were produced in a manner similar to Example 4 except for the differences noted in Table 2 and discussed below. The continuous phase and its ratio of the total is reported as major phase. The disperse phase and its ratio of the total is reported as minor phase. The value reported for blend thickness represents the approximate thickness of the core layer in microns. The thickness of the skin layers varied when the core layer thickness varied, but was kept to a constant ratio, i.e., the skin layers were approximately equal and the total of the two skin layers was about one-third of the total thickness. The size of the disperse phase was determined for some samples by either scanning electron microscope (SEM) or transmission electron microscope (TEM). Those examples which were subsequently stretched using the laboratory batch orienter are shown by an "X" in the column labeled Batch Stretched.

TABLE 2

| Example Number | Major Phase | Major Phase (%) | Minor Phase | Minor Phase (%) | Core Layer (microns) | Additive 1 | Additive 2 | SEMs | TEM (microns) | Batch Stretched |
|---|---|---|---|---|---|---|---|---|---|---|
| 30 | PEN.42 | 75 | sPS-200-4 | 25 | 9.8 | — | — | — | — | — |
| 31 | PEN.42 | 75 | sPS-200-4 | 25 | 16.3 | — | — | 10 | — | — |
| 32 | PEN.47 | 75 | sPS-200-4 | 25 | 9.8 | — | — | — | — | x |
| 33 | PEN.47 | 75 | sPS-200-4 | 25 | 16.3 | — | — | 8 | — | x |
| 34 | PEN.47 | 50 | sPS-200-4 | 50 | 9.8 | — | — | — | — | — |
| 35 | PEN.47 | 50 | sPS-200-4 | 50 | 16.3 | — | — | 5 | — | x |
| 36 | PEN.47 | 90 | sPS-200-4 | 10 | 9.8 | — | — | — | — | — |
| 37 | PEN.47 | 90 | sPS-200-4 | 10 | 16.3 | — | — | 3 | — | x |
| 38 | PEN.53 | 75 | sPS-200-4 | 25 | 9.8 | — | — | — | — | — |
| 39 | PEN.53 | 75 | sPS-200-4 | 25 | 16.3 | — | — | 7 | — | x |
| 40 | PEN.56 | 75 | sPS-200-4 | 25 | 9.8 | — | — | — | — | — |
| 41 | PEN.56 | 75 | sPS-200-4 | 25 | 16.3 | — | — | 6 | — | x |
| 42 | sPS-200-4 | 75 | PEN.42 | 25 | 9.8 | — | — | — | — | — |
| 43 | sPS-200-4 | 75 | PEN.42 | 25 | 16.3 | — | — | — | — | — |
| 44 | sPS-200-4 | 75 | PEN.47 | 25 | 9.8 | — | — | — | — | — |
| 45 | sPS-200-4 | 75 | PEN.47 | 25 | 16.3 | — | — | — | — | x |
| 46 | sPS-200-4 | 75 | PEN.53 | 25 | 16.3 | — | — | — | — | — |
| 47 | sPS-200-4 | 75 | PEN.53 | 25 | 9.8 | — | — | — | — | — |
| 48 | sPS-200-4 | 75 | PEN.56 | 25 | 9.8 | — | — | — | — | — |
| 49 | sPS-200-4 | 75 | PEN.56 | 25 | 16.3 | — | — | — | — | — |
| 50 | PET.60 | 75 | Ecdel ™ 9967 | 25 | 16.3 | — | — | — | — | — |
| 51 | PET.60 | 75 | Surlyn ™ 1706 | 25 | 16.3 | — | — | 2 | — | — |
| 52 | PEN.47 | 75 | Ecdel ™ 9967 | 25 | 16.3 | — | — | 2 | — | x |
| 53 | PEN.47 | 100 | — | — | 16.3 | — | — | — | — | — |
| 54 | PEN.47 | 75 | sPS-200 | 25 | 16.3 | — | — | — | — | — |
| 55 | PEN.47 | 75 | sPS-200 | 25 | 9.8 | — | — | 10 | — | — |
| 56 | PEN.47 | 75 | sPS-320 | 25 | 9.8 | — | — | 12 | — | — |
| 57 | PEN.47 | 75 | sPS-320 | 25 | 16.3 | — | — | — | — | — |
| 58 | PEN.47 | 95 | sPS-320 | 5 | 9.8 | — | — | — | — | — |

TABLE 2-continued

| Example Number | Major Phase | Major Phase (%) | Minor Phase | Minor Phase (%) | Core Layer (microns) | Additive 1 | Additive 2 | SEMs | TEM (microns) | Batch Stretched |
|---|---|---|---|---|---|---|---|---|---|---|
| 59 | PEN.47 | 95 | sPS-320 | 5 | 16.3 | — | — | — | — | — |
| 60 | PEN.56 | 100 | — | — | 16.3, 9.8 | — | — | — | — | x |
| 61 | PEN.56 | 75 | sPS-200 | 25 | 9.8 | — | — | 10 | — | — |
| 62 | PEN.56 | 75 | sPS-200 | 25 | 16.3 | — | — | — | — | x |
| 63 | PEN.56 | 95 | sPS-200 | 5 | 9.8 | — | — | — | — | — |
| 64 | PEN.56 | 95 | sPS-200 | 5 | 16.3 | — | — | — | — | x |
| 65 | PEN.56 | 75 | sPS-320 | 25 | 9.8 | — | — | 10 | — | — |
| 66 | PEN.56 | 75 | sPS-320 | 25 | 16.3 | — | — | — | — | — |
| 67 | PEN.47 | 95 | sPS-200 | 5 | 16.3 | 2% GMAPS2 | 0.25% ETPB | 1 | 0.3 | x |
| 68 | PEN.47 | 95 | sPS-200 | 5 | 9.8 | 2% GMAPS2 | 0.25% ETPB | — | — | — |
| 69 | PEN.56 | 75 | sPS-200 | 25 | 9.8 | 6% GMAPS2 | 0.25% ETPB | — | — | — |
| 70 | PEN.56 | 75 | sPS-200 | 25 | 16.3 | 6% GMAPS2 | 0.25% ETPB | 0.5 | 2.5 | x |
| 71 | PEN.56 | 75 | sPS-200 | 25 | 9.8 | 2% GMAPS2 | 0.25% ETPB | — | 0.8 | — |
| 72 | PEN.56 | 75 | sPS-200 | 25 | 16.3 | 2% GMAPS2 | 0.25% ETPB | 1 | — | — |
| 73 | PEN.56 | 95 | sPS-200 | 5 | 9.8 | 2% GMAPS2 | 0.25% ETPB | — | — | — |
| 74 | PEN.56 | 95 | sPS-200 | 5 | 16.3 | 2% GMAPS2 | 0.25% ETPB | — | — | — |
| 75 | PEN.56 | 75 | sPS-200 | 25 | 9.8 | 6% GMAPS2 | 0.25% ETPB | — | — | — |
| 76 | PEN.56 | 75 | sPS-200 | 25 | 16.3 | 6% GMAPS2 | 0.25% ETPB | 0.8 | 1 | x |
| 77 | PEN.56 | 75 | sPS-200 | 25 | 9.8 | 2% GMAPS2 | 0.25% ETPB | — | — | — |
| 78 | PEN.56 | 75 | sPS-200 | 25 | 16.3 | 2% GMAPS2 | 0.25% ETPB | — | — | — |
| 79 | PEN.56 | 75 | sPS-200 | 25 | 9.8 | 6% GMAPS2 | 0.25% ETPB | — | — | — |
| 80 | PEN.56 | 75 | sPS-200 | 25 | 16.3 | 6% GMAPS2 | 0.25% ETPB | — | — | x |
| 81 | PEN.56 | 75 | sPS-200 | 25 | 9.8 | 6% GMAPS2 | 0.25% ETPB | — | — | — |
| 82 | PEN.56 | 75 | sPS-200 | 25 | 16.3 | 6% GMAPS2 | 0.25% ETPB | 0.5 | — | — |
| 83 | PEN.56 | 95 | sPS-200 | 5 | 9.8 | 2% GMAPS2 | 0.25% ETPB | — | — | — |
| 84 | PEN.56 | 95 | sPS-200 | 5 | 16.3 | 2% GMAPS2 | 0.25% ETPB | — | — | — |
| 85 | PEN.56 | 75 | sPS-200 | 25 | 9.8 | 0.5% GMAPS2 | 0.25% ETPB | — | — | — |
| 86 | PEN.56 | 75 | sPS-200 | 25 | 9.8 | 0.5% GMAPS2 | 0.25% ETPB | — | — | — |
| 87 | PEN.47 | 75 | Eastar | 25 | 16.3 | — | — | — | — | x |
| 88 | PEN.47 | 75 | Eastar | 25 | 9.8 | — | — | — | — | — |
| 89 | PEN.47 | 75 | Eastar | 25 | 16.3 | — | — | — | — | — |
| 90 | PEN.47 | 75 | Eastar | 25 | 9.8 | — | — | — | — | — |
| 91 | PEN.47 | 75 | PMMA VO44 | 25 | 9.8 | — | — | — | — | — |
| 92 | PEN.47 | 75 | PMMA VO44 | 25 | 16.3 | — | — | 10 | — | — |
| 93 | PEN.47 | 75 | PMMA VO44 | 25 | 16.3 | 6% MMA/GMA | — | — | 0.7 | — |
| 94 | PEN.47 | 75 | PMMA VO44 | 25 | 9.8 | 6% MMA/GMA | — | — | — | — |
| 95 | PEN.47 | 75 | PMMA VO44 | 25 | 9.8 | 2% MMA/GMA | — | — | 1.2 | — |
| 96 | PEN.47 | 75 | PMMA | 25 | 16.3 | 2% MMA/GMA | — | — | — | x |
| 97 | PEN.47 | 75 | sPS-200-4 VO44 | 25 | 916.3 | 0.5% Congo Red | — | — | — | x |
| 98 | PEN.47 | 75 | sPS-200-4 | 25 | 16.3 | 0.15% Congo Red | — | — | — | x |
| 99 | PEN.47 | 75 | sPS-200-4 | 25 | 9.8 | 0.25% Methylene Blue | — | — | — | — |
| 100 | PEN.47 | 75 | sPS-200-4 | 25 | 9.8 | 0-0.25% Methylene Blue | — | — | — | — |

29

The presence of the various compatibilizers was found to reduce the size of the included or disperse phase.

EXAMPLE 101

In Example 101, an optical film was made in a manner similar to Example 4 except the resulting core thickness was about 420 microns thick, and each skin layer was about 105 microns thick. The PEN had a 0.56 IV. The cast film was oriented as in Example 1, except the temperature of stretch was 165° C. and there was a 15 day delay between casting and stretching. The transmission was 87.1% and 39.7% for parallel and perpendicularly polarized light, respectively.

EXAMPLES 102-121

In Examples 102-121, optical films were made as in Example 101, except that orientation conditions were varied and/or the sPS-200-0 was replaced with either copolymers of sPS containing either 4 or 8 mole % of para-methyl styrene or with an atactic-form of styrene, Styron 663 (available from Dow Chemical Company, Midland, Mich.) as listed in Table 3. Evaluations of transmission properties are also reported. Transmission values are averaged over all wavelengths between 450-700 nm.

TABLE 3

| Ex. | % sPS | PS | PEN IV | Temperature of Draw (°C.) | Rail Setting (cm) | Perpendicular Transmission (%) | Parallel Transmission (%) |
|---|---|---|---|---|---|---|---|
| 101 | 25 | 200-0 | 0.56 | 165 | 152 | 87.1 | 39.7 |
| 102 | 35 | 200-0 | 0.56 | 165 | 152 | 87.8 | 44.4 |
| 103 | 15 | 200-4 | 0.56 | 165 | 152 | 86.1 | 43.5 |
| 104 | 25 | 200-4 | 0.56 | 165 | 152 | 86.5 | 43.6 |
| 105 | 35 | 200-4 | 0.56 | 165 | 152 | 88.2 | 50.7 |
| 106 | 15 | 200-8 | 0.56 | 165 | 152 | 89.3 | 40.7 |
| 107 | 25 | 200-8 | 0.56 | 165 | 152 | 88.5 | 42.8 |
| 108 | 35 | 200-8 | 0.56 | 165 | 152 | 88.6 | 43.3 |
| 109 | 15 | Styron 663 | 0.56 | 165 | 152 | 89.3 | 45.7 |
| 110 | 25 | Styron 663 | 0.56 | 165 | 152 | 87.8 | 41.6 |
| 111 | 35 | Styron 663 | 0.56 | 165 | 152 | 88.8 | 48.2 |
| 112 | 15 | Styron 663 | 0.48 | 165 | 152 | 88.5 | 62.8 |
| 113 | 25 | Styron 663 | 0.48 | 165 | 152 | 87.1 | 59.6 |
| 114 | 35 | Styron 663 | 0.48 | 165 | 152 | 86.8 | 59.6 |
| 115 | 15 | 200-0 | 0.48 | 165 | 152 | 88.0 | 58.3 |
| 116 | 25 | 200-0 | 0.48 | 165 | 152 | 88.0 | 58.7 |
| 117 | 35 | 200-0 | 0.48 | 165 | 152 | 88.5 | 60.6 |
| 118 | 15 | 200-4 | 0.48 | 165 | 152 | 89.0 | 57.4 |
| 119 | 35 | 200-4 | 0.48 | 165 | 152 | 87.3 | 64.0 |
| 120 | 35 | 200-0 | 0.56 | 171 | 127 | 86.5 | 65.1 |
| 121 | 35 | 200-0 | 0.56 | 171 | 152 | 88.1 | 61.5 |

These examples indicate that the particles of the included phase are elongated in the machine direction in high IV PEN than in low IV PEN. This is consistent the observation that, in low IV PEN, stretching occurs to a greater extent near the surface of the film than at points interior to the film, with the result that fibrillar structures are formed near the surface and spherical structures are formed towards the center.

Some of these Examples suggest that the orientation temperatures and degree entation are important variables in achieving the desired effect. Examples 109 to 114 suggest that quiescent crystallization need not be the only reason for the lack of transmission of a preferred polarization of light.

EXAMPLES 122-124

In Example 122, a multilayer optical film was made in accordance with the invention by means of a 209 layer feedblock. The feedblock was fed with two materials: (1) PEN at 38.6 kg per hour (intrinsic viscosity of 0.48); and (2) a blend of 95% CoPEN and 5% by weight of sPS homopolymer (200,000 molecular weight). The CoPEN was a copolymer based on 70 mole % naphthalene dicarboxylate and 30 mole % dimethyl isophthalate polymerized with ethylene glycol to an intrinsic viscosity of 0.59. The CoPEN/sPS blend was fed into the feedblock at a rate of 34.1 kg per hour.

The CoPEN blend material was on the outside of the extrudate, and the layer composition of the resulting stack of layers alternated between the two materials. The thicknesses of the layers was designed to result in a one-quarter wavelength stack with a linear gradient of thicknesses, and having a 1.3 ratio from the thinnest to the thickest layer. Then, a thicker skin layer of CoPEN (made in accordance with the method described above to make the CoPEN/sPS blend, except the molar ratios were 70/15/15 naphthalene dicarboxylate/dimethyl terephthalate/dimethyl isophthalate) devoid of sPS was added to each side of the 209 layer composite. The total skin layer was added at a rate of 29.5 kg per hour, with about one-half of this quantity on each side or surface of the stack.

The resulting skin layer clad multilayer composite was extruded through a multiplier to achieve a multilayer composite of 421 layers. The resulting multilayer composite was then clad with another skin layer of the 70/15/15 CoPEN on each surface at a total rate of 29.5 kg per hour with about one-half of this quantity on each side. Since this second skin layer may not be separately detectable from the existing skin layer (as the material is the same), for the purposes of this discussion, the resulting extra thick skin layer will be counted as only one layer.

The resulting 421 layer composite was again extruded through a 1.40 ratio asymmetric multiplier to achieve a 841 layer film which was then cast into a sheet by extruding through a die and quenching into a sheet about 30 mils thick. The resulting cast sheet was then oriented in the width direction using a conventional film making tentering device. The sheet was stretched at a temperature of about 300° F. (149° C.) to a stretch ratio of about 6:1 and at a stretch rate of about 20% per second. The resulting stretched film was about 5 mils thick.

In Example 123, a multilayer optical film was made as in Example 122, except that the amount of sPS in the CoPEN/sPS blend was 20% instead of 5%.

In Example 124, a multilayer optical film was made as in Example 122, except that no sPS was added to the film.

The results reported in Table 4 include a measure of the optical gain of the film. The optical gain of a film is the ratio of light transmitted through an LCD panel from a backlight with the film inserted between the two to the light transmitted without the film in place. The significance of optical gain in the context of optical films is described in WO 95/17692 in relation to FIG. 2 of that reference. A higher gain value is generally desirable. The transmission values include values obtained when the light source was polarized parallel to the stretch direction ($T_\parallel$) and light polarized perpendicular to the stretch direction ($T_\perp$). Off-angle-color (OAC) was measured using an Oriel spectrophotometer as the root mean square deviation of p-polarized transmission at 50 degree incident light of wavelength between 400 and 700 nm.

TABLE 4

| Ex. | mole % sPS | Gain | $T_\perp$ (%) | $T_\parallel$ (%) | OAC (%) |
|-----|------------|------|---------------|-------------------|---------|
| 122 | 5          | 1.5  | 83            | 2                 | 1.5     |
| 123 | 20         | 1.45 | 81            | 1.5               | 1.2     |
| 124 | 0          | 1.6  | 87            | 5                 | 3.5     |

The value of off-angle-color (OAC) demonstrates the advantage of using a multilayer construction within the context of the present invention. In particular, such a construction can be used to substantially reduce OAC with only a modest reduction in gain. This tradeoff may have advantages in some applications. The values of $T_\parallel$ for the examples of the invention may be lower than expected because light scattered by the sPS dispersed phase may not be received by the detector.

The preceding description of the present invention is merely illustrative, and is not intended to be limiting. Therefore, the scope of the present invention should be construed solely by reference to the appended claims.

What is claimed is:

1. A method for producing an optical body, comprising the steps of:
   providing a composition comprising a continuous phase having a birefringence of at least about 0.05 and a disperse phase, wherein the index of refraction of at least one of the continuous and disperse phases is adjustable by orientation; and
   orienting the composition until the diffuse reflectivity of the composition along at least one axis for at least one polarization of electromagnetic radiation is greater than about 30% and the indices of refraction of the first and second phases differ by more than about 0.05 along a first of three mutually orthogonal axes but differ by less than about 0.05 along a second of three mutually orthogonal axes.

2. The method of claim 1, wherein the birefringence of the continuous phase is at least about 0.1.

3. The method of claim 1, wherein the birefringence of the continuous phase is at least about 0.15.

4. The method of claim 1, wherein the birefringence of the continuous phase is at least about 0.2.

5. The method of claim 1, wherein the composition is oriented until the indices of refraction of the first and second phases differ by more than about 0.1 along the first of three mutually orthogonal axes.

6. The method of claim 1, wherein the composition is oriented until the indices of refraction of the first and second phases differ by more than about 0.15 along the first of three mutually orthogonal axes.

7. The method of claim 1, wherein the composition is oriented until the indices of refraction of the first and second phases differ by more than about 0.2 along the first of three mutually orthogonal axes.

8. The method of claim 1, wherein the composition is oriented until the indices of refraction of the first and second phases differ by less than about 0.03 along the second of three mutually orthogonal axes.

9. The method of claim 1, wherein the composition is oriented until the indices of refraction of the first and second phases differ by less than about 0.01 along the second of three mutually orthogonal axes.

10. The method of claim 1, wherein the composition is oriented until the diffuse reflectivity of the composition is greater than about 50%.

11. A method for producing an optical body, comprising the steps of:
    providing a first resin whose index of refraction is adjustable along a first of three mutually orthogonal axes;
    providing a second resin;
    incorporating the second resin as a disperse phase within a matrix of the first resin; and
    orienting the first resin along the first axis until the indices of refraction of the first and second resins are substantially mismatched along the first axis, but are substantially matched along a second of the three mutually orthogonal axes, and the diffuse reflectivity for said matrix and said disperse phase taken together along at least one axis for at least one polarization of electromagnetic radiation is at least about 30%.

12. The method of claim 11, wherein the optical body is a film, and wherein the second of three mutually orthogonal axes is perpendicular to the plane of the film.

13. The method of claim 11, wherein the second resin is incorporated into the matrix before it is oriented.

14. The method of claim 11, wherein the first resin is uniaxially oriented.

15. The method of claim 11, wherein the first resin is biaxially oriented.

16. The method of claim 11, wherein the first resin is stretched to a stretch ratio of at least about 2.

17. The method of claim 11, wherein the first resin is stretched to a stretch ratio of at least about 4.

18. The method of claim 11, wherein the first resin is stretched to a stretch ratio of at least about 6.

19. The method of claim 11, wherein the first and second resins are thermoplastic polymers.

20. The method of claim 11, wherein at least one of the first and second resins comprise a polymer selected from the group consisting of polyethylene naphthalate, polymethylmethacrylate, syndiotactic polystyrene, and the alkyl derivatives of these polymers.

21. The method of claim 11, wherein the dispersed phase is randomly dispersed throughout the matrix, and wherein the matrix is oriented in at least one direction.

22. The method of claim 11, wherein the dispersed phase comprises a plurality of essentially rod-like masses after orientation.

23. The method of claim 11, wherein the dispersed phase comprises a plurality of particles which are essentially rod-like in shape prior to orientation.

24. A method for producing an optical body, comprising the steps of:
    providing a first resin whose index of refraction is adjustable along a first of three mutually orthogonal axes;
    providing a second resin;
    incorporating the second resin as a disperse phase within a matrix of the first resin; and
    orienting the first resin along the first axis until (i) the absolute value of the difference in index of refraction of said first and second resins is $\Delta n_1$ along a first axis and $\Delta n_2$ along a second axis orthogonal to said first axis, (ii) the absolute value of the difference between $\Delta n_1$ and $\Delta n_2$ is at least about 0.05, and (iii) the diffuse reflectivity of said first and second resins taken together along at least one axis for at least one polarization of electromagnetic radiation is at least about 30%.

25. The method of claim 24, wherein wherein the absolute value of the difference between $\Delta n_1$ and $\Delta n_2$ is at least about 0.1.

26. The method of claim 24, wherein said matrix has a larger birefringence than said disperse phase.

27. The method of claim 26, wherein the birefringence of said matrix is at least 0.02 greater than the birefringence of said disperse phase.

28. The method of claim 26, wherein the birefringence of said matrix is at least 0.05 greater than the birefringence of said disperse phase.

29. A method for producing an optical body, comprising the steps of:

providing a first phase having a birefringence of at least about 0.05 whose index of refraction is adjustable along a first of three mutually orthogonal axes;

providing a second phase which is discontinuous along at least two of any three mutually orthogonal axes;

incorporating the second phase into the first phase; and orienting the first phase along the first axis until (i) the absolute value of the difference in index of refraction of said first and second phases is $\Delta n_1$ along a first axis and $\Delta n_2$ along a second axis orthogonal to said first axis, (ii) the absolute value of the difference between $\Delta n_1$ and $\Delta n_2$ is at least about 0.05, and (iii) the diffuse reflectivity of said first and second phases taken together along at least one axis for at least one polarization of electromagnetic radiation is at least about 30%.

30. The method of claim 29, wherein the optical body is a film.

31. The method of claim 24, wherein the optical body is a film.

32. The method of claim 11, wherein the optical body is a film.

33. The method of claim 1, wherein the composition is extruded into a film before it is oriented.

34. The method of claim 1, wherein the composition is extruded into a film before it is oriented.

35. The method of claim 24, wherein the first resin is extruded into a film before it is oriented.

36. A method for producing an optical body, comprising the steps of:

providing a composition comprising a continuous phase having a birefringence of at least about 0.05, and a disperse phase which is randomly aligned within the continuous phase, wherein the index of refraction of at least one of the continuous and disperse phases is adjustable by orientation; and orienting the composition until the indices of refraction of the first and second phases differ by more than about 0.05 along a first of three mutually orthogonal axes but differ by less than about 0.05 along a second of three mutually orthogonal axes, and the diffuse reflectivity of the composition along at least one axis for at least one polarization of electromagnetic radiation is greater than about 30%.

37. The method of claim 36, wherein the composition is oriented until the diffuse reflectivity of the composition is greater than about 30% for at least one polarization of visible light.

38. A method for producing an optical body, comprising the steps of:

providing a composition comprising (i) a first resin whose index of refraction is adjustable along a first of three mutually orthogonal axes, and (ii) a second resin which is randomly oriented within the first resin; and orienting the first resin along the first axis until (i) the absolute value of the difference in index of refraction of said first and second resins is $\Delta n_1$ along a first axis and $\Delta n_2$ along a second axis orthogonal to said first axis, (ii) the absolute value of the difference between $\Delta n_1$ and $\Delta n_2$ is at least about 0.05, and (iii) the diffuse reflectivity of said first and second phases taken together along at least one axis for at least one polarization of electromagnetic radiation is at least about 30%.

39. The method of claim 38, wherein the diffuse reflectivity of said first and second resins taken together along at least one axis for at least one polarization of visible light is at least about 30%.

40. The method of claim 24, wherein the first resin is oriented until the diffuse reflectivity of the first and second resins taken together is greater than about 30% for at least one polarization of visible light.

41. The method of claim 29, wherein the first phase is oriented until the diffuse reflectivity of the first and second phases taken together is greater than about 30% for at least one polarization of visible light.

42. A method for producing an optical body which diffusely reflects electromagnetic radiation of wavelength $\lambda$ having a first polarization and which specularly transmits electromagnetic radiation of wavelength $\lambda$ having a second polarization, comprising the steps of:

providing a composition comprising a continuous phase of strain-induced birefringent material and a disperse phase disposed within the continuous phase, wherein the disperse phase comprises a plurality of particles that are larger than about $2\lambda$ in a first dimension and are larger than about $\lambda/30$ but smaller than about $\lambda$ in a second and third dimension; and orienting the composition until the indices of refraction of the continuous and disperse phases differ by more than about 0.05 for electromagnetic radiation of wavelength $\lambda$ polarized along a first of three mutually orthogonal axes but differ by less than about 0.05 for electromagnetic radiation of wavelegnth $\lambda$ polarized along a second of three mutually orthogonal axes, and the diffuse reflectivity of the composition along at least one axis for at least one polarization of electromagnetic radiation of wavelegnth $\lambda$ is at least about 30%.

43. The method of claim 42, wherein the composition is oriented until the diffuse reflectivity of the composition toward the first polarization electromagnetic radiation of wavelength $\lambda$ is greater than about 50%.

44. The method of claim 42, wherein the plurality of particles are larger than about $4\lambda$ in the first dimension.

45. The method of claim 42, wherein the plurality of particles are smaller than about $0.5\lambda$ in at least one of the second and third dimensions.

46. The method of claim 42, wherein the plurality of particles are smaller than about $0.5\lambda$ in both of the second and third dimensions.

47. The method of claim 42, wherein $\lambda$ is in the visible region of the spectrum.

48. The method of claim 42, wherein the continuous phase and the disperse phase are diverse thermoplastic polymers.

* * * * *

UNITED STATES PATENT AND TRADEMARK OFFICE
CERTIFICATE OF CORRECTION

PATENT NO.   : 5,783,120  
DATED        : July 21, 1998  
INVENTOR(S)  : Andrew J. Ouderkirk, Lockwood W. Carlson, Arthur L. Kotz, Timothy J. Nevitt, Carl A. Stover, Michael F. Weber, Richard C. Allen and Biswaroop Majumdar Page 1 of 1

It is certified that error appears in the above-identified patent and that said Letters Patent is hereby corrected as shown below:

Column 8,  
Line 32, delete -- "is" --.

Column 12,  
Line 39, delete -- "to" --.

Column 14,  
Line 52, "polyarnic" should read -- polyamic --.

Column 18,  
Line 59, "diphenyl-bis-oc-naphthylamine" should read -- diphenyl-bis-a-naphthylamine --.

Column 19,  
Line 48, delete -- "s" --.

Column 27 and 28,  
Example Number 97 under the column Core Layer (microns), "916.3" should read -- 16.3 --.

Column 29,  
Line 58, after "consistent" insert -- with --.  
Line 64, "entation" should read -- orientation --.

Signed and Sealed this

Twenty-seventh Day of November, 2001

*Attest:*

*Attesting Officer*

NICHOLAS P. GODICI  
*Acting Director of the United States Patent and Trademark Office*